United States Patent [19]

Evans et al.

[11] Patent Number: 5,873,546
[45] Date of Patent: Feb. 23, 1999

[54] SYSTEM AND METHOD FOR CONDUCTING ONE ENGINE INOPERATIVE FLIGHT PROCEDURES TRAINING IN A DUAL-ENGINE HELICOPTER

[75] Inventors: Charles W. Evans, Norfolk, Conn.; Karl W. Saal, Jr.; Jeffrey L. Cole, both of Stuart, Fla.

[73] Assignee: Sikorsky Aircraft Corporation, Stratford, Conn.

[21] Appl. No.: 878,712

[22] Filed: Jun. 19, 1997

[51] Int. Cl.[6] .................................................. B64C 27/00
[52] U.S. Cl. ...................... 244/17.13; 701/114; 244/175; 244/194
[58] Field of Search ................................ 244/17.13, 175, 244/194, 195; 701/114, 100, 107, 99

[56] References Cited

U.S. PATENT DOCUMENTS 5,363,317  11/1994  Rice et al. ............................... 701/100

OTHER PUBLICATIONS

Sikorsky S–76 Flight Manual, FAA Approved 19 Jun. 1996, pp. 1–13 to –15; 1–19 to –20; 1–22; 3–2; 1–1 to –4; 1–7 to –8; 1–10 to –13; 1–15 to –16; 5–6 to –7.
D. Trivier and O. Bosqui, "30–Second/2–Minute One Engine Inoperative Certification for the AS 332 Super Puma MK II", Sep. 15–18, 1992.
J. Cole, C. Evans, C. Greenberg, Sr., and K. Saal, "Development and Qualification of the S–76 C+ Helicopter with 30–Second/2–Minute QEI Power Ratings", Apr. 29–May 1, 1997.

*Primary Examiner*—Galen L. Barefoot
*Attorney, Agent, or Firm*—Terrance J. Radke

[57] ABSTRACT

A system and method for conducting one engine inoperative (OEI) flight procedures training in a dual-engine helicopter includes a multi-function OEI training switch that is operative to initiate OEI flight procedures training by selecting one of said engines as the single operative engine for OEI flight procedures training, and a training function module that is: (1) operative to establish suppressed 30-second, 2-minute, and maximum continuous OEI operating limits for selected engine operating parameters to limit the actual power provided by said powerplant system during OEI flight procedures training; and (2) operative to generate biasing factors to control the operation of the parametric indicators for the selected engine operating parameters during OEI flight procedures training. During OEI flight procedures training, the training function module limits the actual power output of the helicopter powerplant system to the suppressed 30-second, 2-minute, or maximum continuous OEI operating limits, as selected by the pilot, while simultaneously utilizing the biasing factors to cause the parametric indicators of the selected operative engine to provide display indications to the pilot that the selected operative engine is operating at the actual 30-second, 2-minute, or maximum continuous OEI operating limits, as applicable.

2 Claims, 10 Drawing Sheets

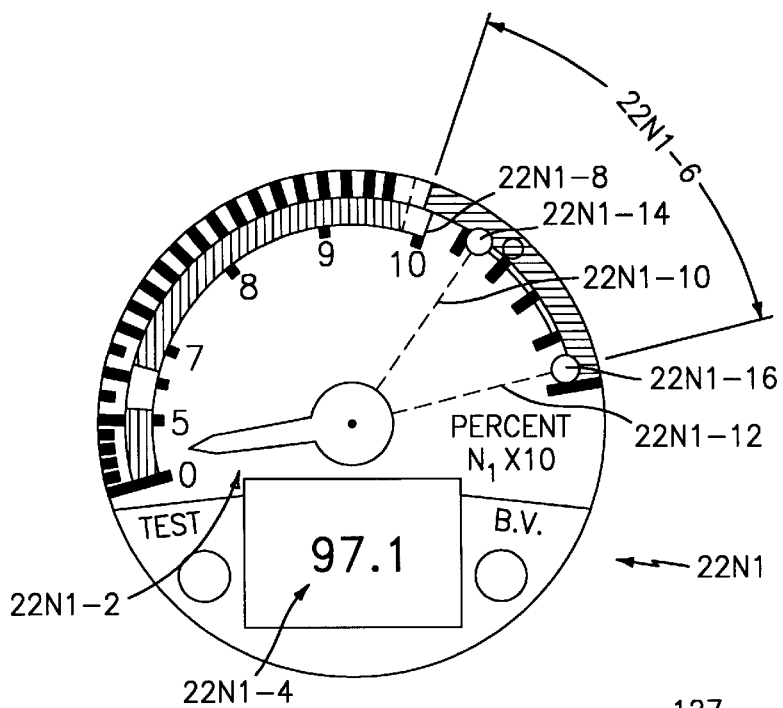
FIG. 3
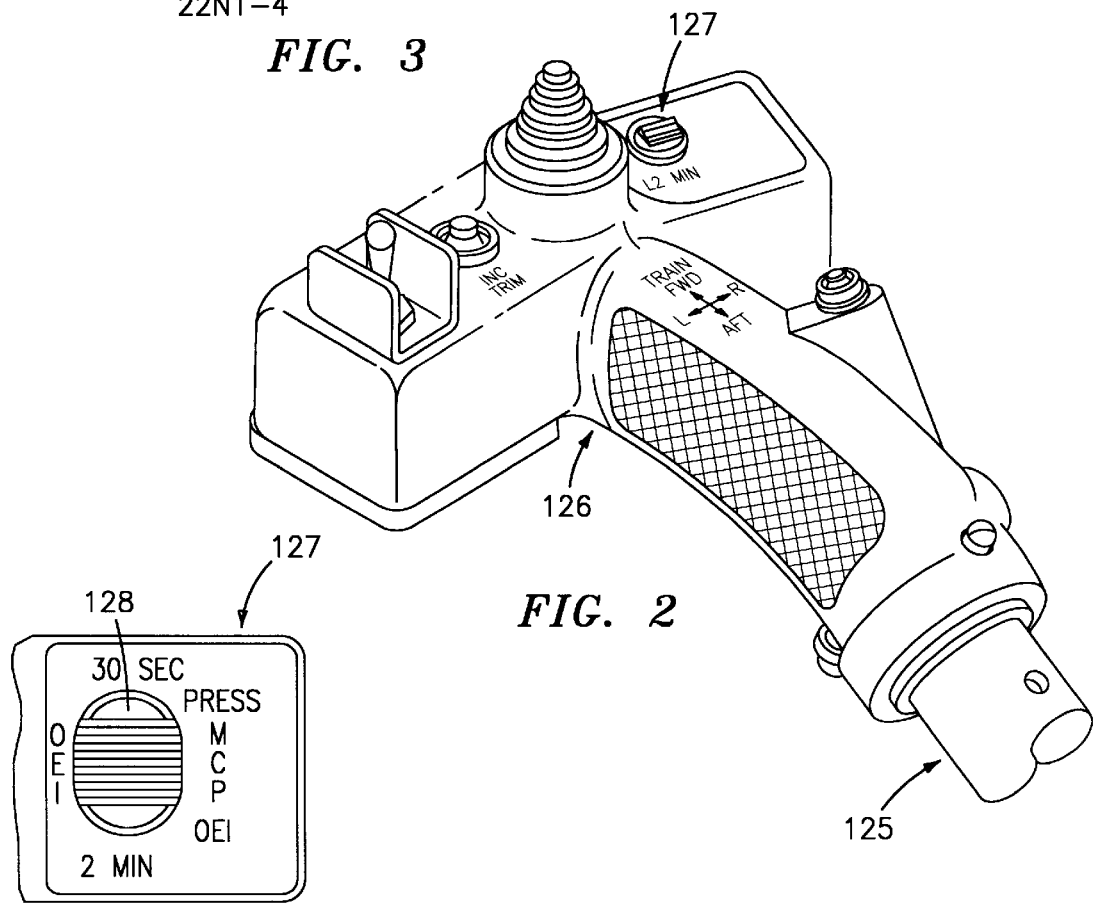
FIG. 2
FIG. 2A

SYSTEM AND METHOD FOR CONDUCTING ONE ENGINE INOPERATIVE FLIGHT PROCEDURES TRAINING IN A DUAL-ENGINE HELICOPTER

TECHNICAL FIELD

The present invention relates generally to dual-engine helicopters, and more specifically, to a system and method for conducting one engine inoperative (OEI) flight procedures training in a dual-engine helicopter.

BACKGROUND OF THE INVENTION

Many of the helicopters being operated today embody a dual-engine powerplant system. A dual-engine powerplant system enhances the normal flight capabilities of a helicopter, thereby increasing the utility of the helicopter for revenue flight operations. In addition, a significant feature inherent in a dual-engine helicopter is the capability of the dual-engine powerplant system to provide sufficient power to facilitate continued flight operations in safety, particularly take offs and landings (take offs and landings being the most critical segments of the helicopter flight envelope), in the event of a one engine inoperative (OEI) condition, e.g., a single-engine failure.

Since the OEI condition is statistically a low-occurrence event, the engines of a helicopter dual-engine powerplant system are designed primarily for dual-engine flight operations. That is, each engine is designed to specific power limits or ratings for dual-engine flight operations, e.g., a startup power rating, a take off power rating, a maximum continuous power rating (maximum power settings at which the engines may be continuously operated during dual-engine flight operations without incurring damage), a normal cruise power rating (power settings slightly lower than maximum continuous power rating that are typically established to comply with the engine maker's warranties), a 10-second transient power rating, and a 20-second transient power rating. During dual-engine flight operations, therefore, the helicopter is operated in such a manner that the design power ratings of the engines are not exceeded. In the sophisticated helicopters of today, the operation of the powerplant system is primarily controlled by a computer system (discussed in further detail hereinbelow), and such an engine computer control system typically includes protective logic routines (in the form of hardware, firmware, software, and/or combinations thereof) that automatically prevent the engine design power ratings from being exceeded during dual-engine flight operations.

A dual-engine helicopter that experiences an OEI condition, especially during a take off or landing, is subject to a potentially hazardous flight condition since the design power ratings of the single operative engine do not provide sufficient power for the safe operation of the helicopter under such a circumstance. Aviation regulatory authorities, therefore, have established general overdesign criteria for the powerplant system of a dual-engine helicopter to ensure that the helicopter can be safely operated utilizing a single operative engine during OEI flight operations. These criteria have resulted in the overdesign of the engines comprising the helicopter powerplant system so that a single operative engine is capable of providing a 30-second OEI power rating, a 2-minute OEI power rating, and a maximum continuous OEI power rating that ensure safe helicopter flight operations during OEI flight operations.

The overdesign of a dual-engine helicopter powerplant system to provide such OEI power ratings, however, is subject to antithetical considerations. On one hand, the greater the OEI power ratings overdesigned into the powerplant system, the larger the margin of safety with respect to helicopter flight operations during an OEI condition. Conversely, however, the greater the OEI power ratings overdesigned into the powerplant system, the larger are the costs, volume, and weight associated with the overdesigned powerplant system, particularly in light of the fact that the OEI power ratings are not utilized during dual-engine flight operations and the fact that an OEI condition is a low probability event.

Pragmatically, therefore, a helicopter dual-engine powerplant system is overdesign optimized to provide a margin of safety during helicopter OEI flight operations while concomitantly minimizing the costs, volume, and weight associated with the overdesigned dual-engine powerplant system. One consequence of this pragmatic design approach is that for a helicopter subjected to OEI flight operations, there is a statistically-significant probability, especially during utilization of the 30-second OEI power rating, that the single operative engine of the dual-engine powerplant system will be subjected to some degree of damage. Accordingly, for a helicopter subjected to OEI flight operations, there is a requirement that the dual-engine powerplant system be subjected to apposite maintenance procedures (at a minimum, inspection and maintenance; at a maximum, removal and replacement) prior to resuming dual-engine flight operations. While the pragmatic design approach described hereinabove is a logical solution to a complex situation, this approach is problematical when one considers helicopter pilot training requirements.

The objective of initial pilot certification and pilot refresher training is to ensure that pilots achieve and maintain a high degree of proficiency in all aspects of helicopter flight operations, including emergency procedures such as OEI flight operations. Such proficiency is typically achieved by repetitive training that is conducted under actual flight conditions, e.g., actual flight envelopes, actual gross weights (based upon pressure altitude and ambient temperature), actual power settings, actual instrument displays. An examination of the foregoing disclosure, however, should make it apparent that training in OEI flight operations under actual OEI flight conditions, particularly with respect to OEI flight operations utilizing the 30-second power rating, is not a realistic approach due to the possibility of sustaining some degree of engine damage during actual OEI flight operations. Therefore, approaches other than flight operations under actual OEI flight conditions have been developed to provide pilots with the required OEI flight training.

One approach to conducting OEI flight procedures training is to throttle one engine to an idle condition (to simulate an OEI condition) and conduct OEI flight procedures training utilizing the reduced power output of a "single operative engine". Typically, the reduced power output of the single operative engine is limited to a single power rating (as opposed to 30-second, 2-minute, and maximum continuous OEI power ratings available during actual OEI flight operations). The parametric indicators for the relevant engine operating factors provide display indications that are indicative of the actual reduced power outputs of the single operative engine, e.g., the power output prescribed by the single power rating.

Another approach involved conducting OEI flight procedures training utilizing both engines operating at an intermediate power output rating. In this approach, each engine is operated at a reduced power rating so that both engines in combination provide a power output at the intermediate power output rating that is equivalent to the power output provided by a single operative engine operating under the 30-second OEI power ratings. The parametric indicators of the relevant engine operating parameters provide display indications that are indicative of the actual reduced power outputs being provided by each engine.

Both of the foregoing exemplary approaches are deficient in one or more aspects. Each approach provides a single power output during OEI flight procedures training in contrast to the three power output levels provided by the helicopter powerplant system during actual OEI flight operations, e.g., the 30-second, 2-minute, and maximum continuous OEI power ratings. In addition, and perhaps more importantly from a training perspective, the status indicators for the relevant engine operating parameters provide display indications are limited to the prescribed power outputs of the approach, i.e., the displays indications are not totally consistent with the display indications that are relevant to actual OEI flight operations. In addition, there is no indication that conventional approaches to OEI flight procedures training are based upon correlated "training gross weights" for OEI flight procedures training to provide dual-engine helicopter handling characteristics that simulate the handling characteristics of a dual-engine helicopter subject to OEI flight operations while operating at an "allowable gross weight".

A need exists to provide a system and method for conducting OEI flight procedures training in a dual-engine helicopter that provides a high degree of realism, yet ensures a high degree of safety. Such a system and method should have a capability of providing a spectrum of reduced power outputs for OEI flight procedures training that realistically simulate the 30-second, 2-minute, and maximum continuous OEI power ratings that govern actual OEI flight operations. Furthermore, such a system and method should have the capability to provide display indications for selected engine operating parameters during OEI flight procedures training that correspond to the actual display indications perceived during OEI flight operations under actual 30-second, 2-minute, and maximum continuous OEI power ratings, even though the dual-engine helicopter is conducting OEI flight procedures training under reduced power outputs. In addition, the system and method should provide a mechanism for selecting "training gross weights" for OEI flight procedures training that are correlated with "allowable gross weights" so that the handling characteristics of a dual-engine helicopter subject to OEI flight procedures provides a high degree of realism to the handling characteristics of a dual-engine helicopter, which is operating at such allowable gross weights, that is subjected to OEI flight operations.

DISCLOSURE OF THE INVENTION

One object of the present invention is to provide a system and method for conducting OEI flight procedures training in a dual-engine helicopter that provides a high degree of realism, yet ensures a high degree of safety.

Another object of the present invention is to provide a system and method for conducting OEI flight procedures training in a dual-engine helicopter wherein such system and method provides a spectrum of reduced power outputs for OEI flight procedures training that realistically simulate the 30-second, 2-minute, and maximum continuous OEI power ratings that govern actual OEI flight operations.

A further object of the present invention is to provide a system and method for conducting OEI flight procedures training in a dual-engine helicopter wherein such system and method provides display indications for selected engine operating parameters during OEI flight procedures training that correspond to the actual display indications perceived during OEI flight operations under actual 30-second, 2-minute, and maximum continuous OEI power ratings, even though the dual-engine helicopter is conducting OEI flight procedures training under reduced power outputs that are less than the actual 30-second, 2-minute, and maximum continuous OEI power ratings, respectively.

Still another object of the present invention is to provide a system and method for conducting OEI flight procedures training in a dual-engine helicopter wherein such system and method provides a mechanism for selecting "training gross weights" for OEI flight procedures training that are correlated with "allowable gross weights" so that the handling characteristics of a dual-engine helicopter subject to OEI flight procedures provides a high degree of realism to the handling characteristics of a dual-engine helicopter, which is operating at such allowable gross weights, that is subjected to OEI flight operations.

These and other objects are achieved by a system and method according to the present invention for conducting one engine inoperative flight procedures training in a dual-engine helicopter comprising a powerplant system for generating the power required for normal dual-engine and OEI flight operations of the dual-engine helicopter, and a collective control system operative to provide control inputs to the powerplant system to control the normal dual-engine and OEI flight operations of the dual-engine helicopter. The powerplant system includes left and right engines, each engine having design power ratings established therefore to limit the power output of the powerplant system during normal dual-engine flight operations and having 30-second, two-minute, and maximum continuous OEI power ratings established therefore to limit the power output of the single operative engine during OEI flight operations, a plurality of sensors associated with each of the engines for monitoring the operating parameters thereof and generating sensor signals representative of the operating parameters of each of the engines, a cockpit instrument display system that includes parametric indicators for the operating parameters of each of the engines that are operative in response to the sensor signals to display indications representative of the operating parameters, a fuel subsystem fluidically interconnected to each of the engines and operative to provide fuel thereto, and a DECU electrically interconnected to each fuel subsystem and operative to regulate fuel flow therefrom to the powerplant system for regulating the power output of the powerplant system to control normal dual-engine and OEI flight operations of the dual-engine helicopter.

The DECU is operative to automatically set the 30-second OEI power rating in response to an OEI condition to limit the power output of the single operative engine of the powerplant system during OEI flight operations, and is further operative in response to activation signals to set the 2-minute and maximum continuous OEI power ratings as applicable to control the OEI flight operations of the dual-engine helicopter by limiting the power output of the single operative engine of the powerplant system to the 2-minute and maximum continuous OEI power ratings as applicable during OEI flight operations.

The collective control system of the system has integrated in combination therewith an OEI select switch that is operative to select the 2-minute and maximum continuous OEI power ratings as appropriate during OEI flight operations and that is operative, in response to selection of the 2-minute OEI power rating or the maximum continuous OEI power rating to generate first and second activation signals that cause operation of the DECUs.

The system further includes a multi-function OEI training switch that is operative to initiate OEI flight procedures training by selecting one of the engines as the single operative engine for OEI flight procedures training and generating a control signal corresponding thereto.

The system further includes a training function module that is: (1) operative to establish suppressed 30-second, 2-minute, and maximum continuous OEI operating limits for selected engine operating parameters to limit the actual power provided by the powerplant system during OEI flight procedures training; (2) operative to generate biasing factors to control the operation of the parametric indicators for the selected engine operating parameters during OEI flight procedures training; (3) automatically operative in response to the control signal from the multi-function OEI training switch to set the suppressed 30-second OEI operating limits wherein the power output of the single operative engine is limited to the suppressed 30-second OEI operating limits during OEI flight procedures training; (4) automatically operative in response to the control signal from the multi-function OEI training switch to set the biasing factors associated with the suppressed 30-second OEI operating limits wherein the parametric indicators for the selected engine operating parameters provide display indications indicative of the 30-second OEI power ratings; (5) operative in response to the first activation signal generated by the OEI select switch to set the suppressed 2-minute OEI operating limits wherein the power output of the single operative engine is limited to the suppressed 2-minute OEI operating limits during OEI flight procedures training; (6) operative in response to the first activation signal generated by the OEI select switch to set the biasing factors associated with the suppressed 2-minute OEI operating limits wherein the parametric indicators for the selected engine operating parameters provide display indications indicative of the 2-minute OEI power ratings; (7) operative in response to the second activation signal generated by the OEI select switch to set the suppressed maximum continous OEI operating limits wherein the power output of the single operative engine is limited to the suppressed maximum continuous OEI operating limits during OEI flight procedures training; and (8) operative in response to the second activation signal generated by the OEI select switch to set the biasing factors associated with the suppressed maximum continuous OEI operating limits wherein the parametric indicators for the selected engine operating parameters provide display indications indicative of the maximum continuous OEI power ratings.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 2 is a partial perspective view of an exemplary collective control stick having a grip that includes a three-position OEI switch assembly integrated in combination therewith that functions as an OEI control system during OEI flight operations for the exemplary powerplant system depicted in FIG. 1.

FIG. 2A is an enlarged plan view of the three-position OEI select switch of the three-position OEI switch assembly of FIG. 3.

FIG. 3 is a detailed plan view of the configuration of an exemplary N1 parametric indicator (N1 tachometer) for a helicopter cockpit instrument display system that functions as an OEI monitoring element for the exemplary powerplant system depicted in FIG. 1 during OEI flight operations.

BEST MODE FOR CARRYING OUT THE INVENTION

Figure 1:
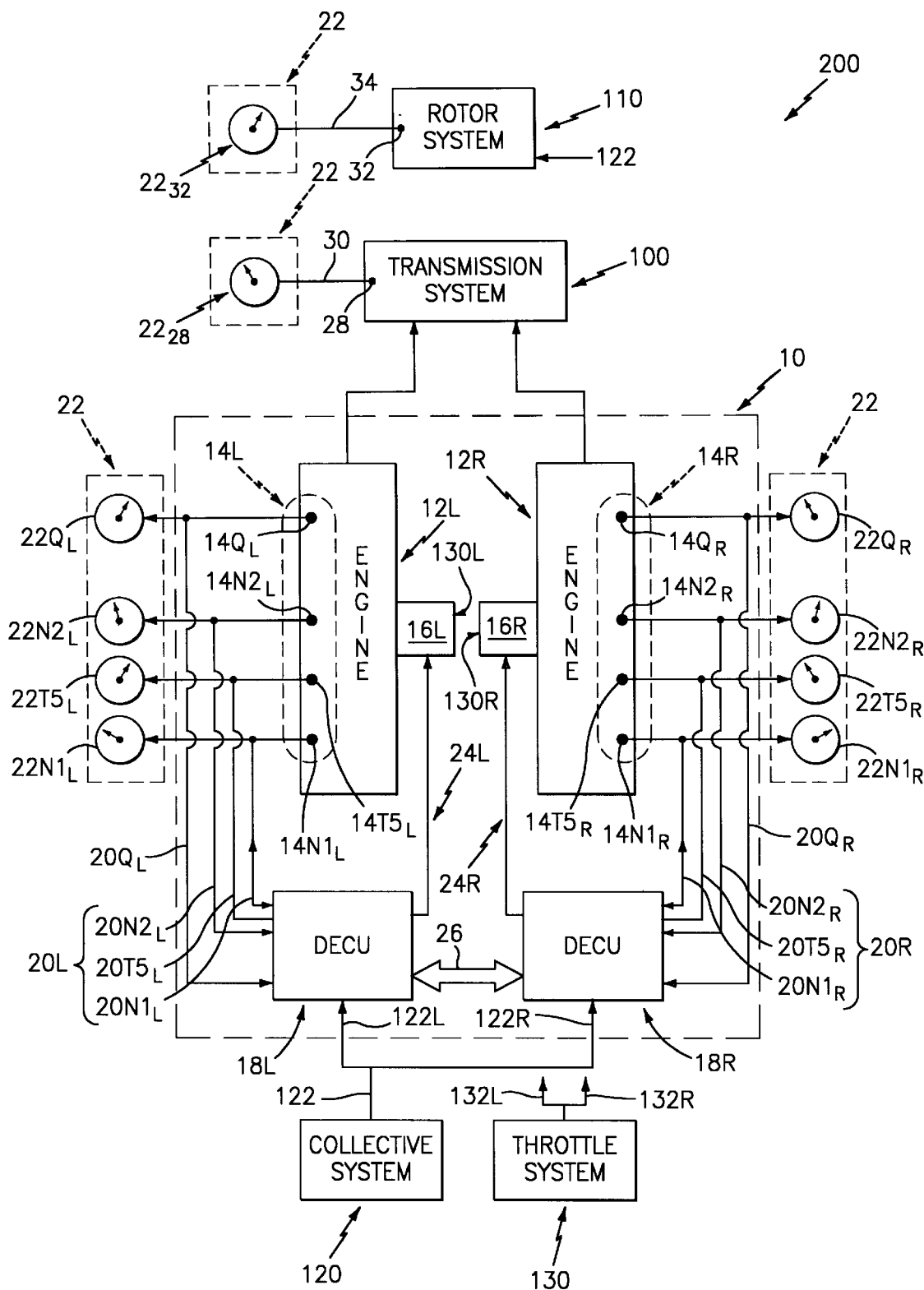
FIG. 1 is a schematic block diagram of selected elements of an exemplary powerplant system for a dual-engine helicopter and selected elements that are functionally integrated in combination with the powerplant system.

Referring now to the drawings wherein like reference numerals and characters represent corresponding or similar elements throughout the several views, FIG. 1 illustrates selected elements of an exemplary dual-engine powerplant system 10 for a dual-engine helicopter and selected elements that are functionally integrated in combination with the powerplant system. The dual-engine powerplant system 10 is mechanically integrated in combination with the helicopter transmission system 100, which, in turn, is mechanically integrated in combination with the helicopter rotor system 110. The powerplant system 10 generates the power available for helicopter flight operations and couples such power to the helicopter rotor system 110 by means of the transmission system 100. The pilot's inputs to the powerplant system 10 to control helicopter dual-engine or OEI flight operations are effected by means of a collective system 120 and/or a manual throttle system 130.

The powerplant system 10 comprises left and right engine packages 12L, 12R, a set of sensors 14L, 14R associated with each engine package 12L, 12R for monitoring the operating parameters thereof, a fuel subsystem 16L, 16R fluidically interconnected to each engine package 12L, 12R (for the purposes of the instant disclosure, the helicopter fuel subsystem is defined as part of the powerplant system 10), and a digital electronic control unit (DECU) 18L, 18R electronically interconnected to the corresponding fuel subsystems 16L, 16R of the engine packages 12L, 12R, respectively. A plurality of signal lines 20L, 20R electronically interconnect individual sensors 14L, 14R to the respective DECUs 18L, 18R, and to a cockpit instrument display system 22 that comprises a plurality of parametric indicators for, inter alia, each engine package 12L, 12R. The DECUs 18L, 18R are electronically interconnected to the respective fuel subsystems 16L, 16R by means of signal lines 24L, 24R. The individual DECUs 18L, 18R are electronically interconnected by means of a signal line 26.

A sensor 28 is integrated in combination with the helicopter transmission system 100 to monitor the torque output therefrom and signals representative of the torque output (W) are transmitted to the cockpit instrument display system 22 by means of a signal line 30. A sensor 32 is integrated in combination with the helicopter rotor system 110 to monitor the rotational speed of the main rotor shaft and signals representative of the rotational speed of the main rotor shaft ($N_R$) are transmitted to the cockpit instrument display system 22 by means of a signal line 34.

To facilitate a fuller appreciation of the operation of the exemplary powerplant system 10 described in the preceding paragraph, the functional features and characteristics of the powerplant system 10 are further described herein in terms of the powerplant system of an S-76C+ helicopter (S-76® is a registered trademark of the Sikorsky Aircraft Corporation) manufactured by Sikorsky Aircraft Corporation. One skilled in the art will appreciate that the ensuing discussion is generally applicable to most, if not all, dual-engine helicopters and the functional features and characteristics thereof that are associated with OEI flight operations (OEI flight operations as used herein refers to both actual OEI flight conditions and OEI flight procedures training).

The engine packages 12L, 12R of the S-76C+ dual-engine powerplant system 10 include Turbomeca Arriel 2S1 engines (each engine comprising an accessory gearbox module, an axial compressor module, a high pressure assembly module, a power turbine module, and a reduction gearbox module) and a pair of independent shafts (one shaft functioning as an input shaft that couples the torque/power generated by the engine 12L/12R to the transmission system 100). For dual-engine flight operations, each Turbomeca Arriel 2S1 engine 12L, 12R has a takeoff power rating of 856 shaft horsepower (SHP), a maximum continuous power rating of 794 SHP, and a normal cruise power rating of 774 SHP. For one engine inoperative (OEI) flight operations, each Turbomeca Arriel 2S1 engine 12L, 12R has a 30-second OEI power rating of 980 SHP, a 2-minute OEI power rating of 889 SHP, and a maximum continuous OEI power rating of 856 SHP.

The sensor set 14 monitors selected operating parameters of the Turbomeca Arriel 2S1 engines 12L, 12R and generates signals representative of such operations for both dual-engine flight operations and OEI flight operations: Individual sensors $14N1_L$, $14N1_R$ monitor engine gas generator speed (N1 expressed as a percentage) of the respective engines 12L, 12R, individual sensors $14N2_L$, $14N2_R$ monitor engine power turbine speed (N2 expressed as a percentage) of the respective engines 12L, 12R, individual sensors $14Q_L$, $14Q_R$ monitor engine torque (Q expressed as a percentage) generated by the respective engines 12L, 12R, and individual sensors $14T5_L$, $14T5_R$ monitor engine power turbine inlet temperature (T5 expressed in degrees Centigrade) of the respective engines 12L, 12R. This set of sensors 14 includes redundant sensors for the N1, N2, and T5 operating parameters.

Signals generated by the individual sensors $14N1_L$, $14N1_R$, $14N2_L$, $14N2_R$, $14Q_L$, $14Q_R$, $14T5_L$, $14T5_R$ are coupled to cockpit instrument display system 22 and the corresponding DECUs 18L, 18R by means of dedicated signal lines $20N1_L$, $20N1_R$, $20N2_L$, $20N2_R$, $20Q_L$, $20Q_R$, $20T5_L$, $20T5_R$. The sensor signals $14N1_L$, $14N1_R$, $14N2_L$, $14N2_R$, $14Q_L$, $14Q_R$, $14T5_L$, $14T5_R$ may be coupled directly to the cockpit instrument display system 22; or alternatively, the sensor signals $14N1_L$, $14N1_R$, $14N2_L$, $14N2_R$, $14Q_L$, $14Q_R$, $14T5_L$, $14T5_R$ may be first coupled to the corresponding DECUs 18L, 18R for signal processing and then subsequently coupled to the cockpit instrument display system 22; or alternatively, selected sensor signals $14N1_L$, $14N1_R$, $14N2_L$, $14N2_R$, $14Q_L$, $14Q_R$, $14T5_L$, $14T5_R$ may be directly coupled to the cockpit instrument display system 22 while other selected sensor signals $14N1_L$, $14N1_R$, $14N2_L$, $14N2_R$, $14Q_L$, $14Q_R$, $14T5_L$, $14T5_R$ may be first processed by the corresponding DECUs 18L, 18R before being coupled to the cockpit instrument display system 22. For example, in the S-76C+ powerplant system 10, the sensor signals $14N1_L$, $14N1_R$ representative of the engine gas generator speed parameter N1 are first processed by the corresponding DECUs 18L, 18R to convert the original sensor signals $14N1_L$, $14N1_R$ to "compensated" sensor signals $14N1_L$, $14N1_R$ that are coupled to the cockpit instrument display system 22 for display thereby. The compensated signal format is utilized to display a fixed set of limits with respect to the engine 12L, 12R that is, in reality, operating at variable limits related to the prevailing environmental conditions.

For the described embodiment, the cockpit instrument display system 22 comprises individual indicators $22N1_L$, $22N1_R$ (N1 tachometers) for displaying the N1 parameter of each engine 12L, 12R, individual indicators $22N2_L$, $22N2_R$ (N2 tachometers) for displaying the N2 parameter of each engine 12L, 12R, individual indicators $22Q_L$, $22Q_R$ (torquemeters) for displaying the engine torque Q generated by the respective engine 12L, 12R, and individual indicators $22T5_L$, $22T5_R$ (T5 indicators) for displaying the T5 parameter of each engine 12L, 12R. The individual parametric indicators comprising the cockpit instrument display system 22 may be digital, analog, or a combination of both, and are used to monitor the operating parameters described hereinabove during both dual-engine and OEI flight operations.

The sensor 28 monitors transmission torque and the sensor 32 monitors the revolutions per minute of the main rotor shaft (not shown, but an element of the rotor system 100). Signals from these sensors 28, 32 are coupled to corresponding parametric indicators $22_{28}$ (W expressed as a percentage), $22_{32}$ ($N_R$ expressed as a percentage) of the cockpit instrument display system 22 by means of dedicated signal lines 30, 34, respectively. [In the S-76C+ helicopter, the N2 tachometers $22N2_L$, $22N2_R$ and the $N_R$ tachometer $22_{32}$ are integrated into a single cockpit display (triple tachometer) for each engine 12L, 12R].

Established numerical values for the operating parameters N1, N2, Q, T5, W described in the preceding paragraphs define the design power limits or ratings (dual-engine flight operations) and the OEI power limits or ratings (OEI flight operations) for the dual-engine powerplant system 10 of any particular helicopter. The first operating parameter N1, N2, Q, T5, W to meet the numerical value established for the design or OEI rating during dual-engine flight operations or OEI flight operations defines the design power rating or OEI power rating of the dual-engine powerplant system 10. For the S-76C+ dual-engine powerplant system 10, the following numerical values have been established for the operating parameters N1, N2, Q, T5, W that define the design and OEI power ratings of the S-76C+ powerplant system 10:

Dual-Engine Flight Operations
  Startup: T5=865° C.
  10-Second Transient: W=115% (230% total torque)
  20-Second Transient: N1=101.2%; N2=109%/115%; Q=160%
  Takeoff: N1=100%; N2=108.5%; Q=104% T5=912° C.; W=100%
  Max Continuous: N1=97.8%; N2=108.5%; Q=104% T5=877° C.; W=100%
  Normal Cruise: N1=97.1%; N2=108.5%; Q=104% T5=869° C.; W=100%
OEI Flight Operations
  30-Second: N1=104.6%; N2=108.5%; Q=135% T5=1000° C.; W=136%
  2-Minute: N1=101.2%; N2=108.5%; Q=127% T5=941° C.; W=136%
  Max Continuous: N1=100.0%; N2=108.5%; Q=116% T5=912° C.; W=128%
  5-Sec Transient: W=150%

The engine fuel subsystem 16L, 16R of the S-76C+ helicopter is a suction-type fuel supply system wherein the individual fuel subsystems 16L, 16R are directly controlled by the corresponding DECUs 18L, 18R during dual-engine flight operations and OEI flight operations. Alternatively, the individual fuel subsystems 16L, 16R can be manually controlled as required by the throttle system 130. Each engine fuel subsystem 16L, 16R comprises a primary fuel tank, a low-pressure pump, a filter, a high-pressure pump, a metering valve, pressure drop regulator combination, and associated direct-feed and cross-feed plumbing. Each engine fuel subsystem 16L, 16R is operative, utilizing its primary fuel tank, to provide fuel to the corresponding engine 12L, 12R of the dual-engine powerplant system 10 under control of the corresponding DECU 18L, 18R. Each engine fuel subsystem 16L, 16R is further operative, under certain conditions, to provide fuel to the opposite engine or to both engines.

The DECUs 18L, 18R are single channel, fail fixed computer systems that electronically control the operation of the engine fuel subsystems 16L, 16R to regulate the flow of fuel to the engines 12L, 12R, thereby controlling the functioning of the engines 12L, 12R during dual-engine flight operations and OEI flight operations. The DECUs 18L, 18R are operative to control, inter alia, the following functions:

automatic engine start including the acceleration of the engines 12L, 12R up to idle.

acceleration of the engines 12L, 12R from ground idle to flight idle.

automatic control of gas generator and free turbine rotation speeds (N1, N2) in order to keep the rotational speed of the main rotor shaft at 107% $N_R$.

automatic load sharing between engines 12L, 12R using basic N1 matching except when torque limited. The load sharing of N1 will mismatch as required to achieve the pertinent torque limit (see power ratings described hereinabove).

automatic fault accommodation to enable a back-up sensor 14L/14R if a primary sensor 14L/14R fails, or utilization of a complementary sensor 14L/14R from the other engine 12L/12R (via signal line 26) if required.

fail fixed control upon detection of a DECU major fault and resultant manual control (by means of the throttle system 130).

automatic limiting of engine 12L, 12R power ratings to the design power ratings during dual-engine flight operations (see disclosure hereinabove).

limiting of engine 12L, 12R power ratings to the OEI power ratings during OEI flight operations—selectable limiting at the three OEI ratings (see disclosure hereinabove) when enabled or automatic default (DECU default logic) to 30-second OEI power rating when conditions do not permit OEI limit selection.

overspeed protection at 122% N2±1%.

normal engine 12L, 12R shutdown.

early warning of a one engine inoperative condition.

power turbine and gas generator cycle counting.

30-second and 2-minute usage recording.

automated engine 12L, 12R health checks.

The pilot controls the flight operations of the helicopter by means of the collective control system 120 and/or the manual throttle system 130. The collective control system 120 includes a collective control stick 125 (see FIG. 2) that is pivoted by the pilot to transmit a signal 122 directly to the rotor system 110 to collectively control the pitch of the rotor blades of the rotor system 100. Simultaneously, the collective control system 120 is operative to transmit corresponding signals 122L, 122R directly to the DECUs 18L, 18R to synchronize or coordinate the power output of the engines 12L, 12R with the corresponding collective pitch input to the rotor blades. The manual throttle system 130 allows the pilot to control dual-engine flight operations or OEI flight operations in the event of a failure of the DECUs 18L, 18R by providing mechanical control signals 132L, 132R directly to the engine fuel subsystems 16L, 16R.

The collective control stick 125 has a grip 126 that includes, inter alia, a three-position OEI switch assembly 127 as exemplarily illustrated in FIG. 2 and as illustrated in further detail in FIG. 2A. The three-position OEI switch assembly 127 functions as the OEI control system for the pilot for controlling OEI power ratings during OEI flight operations (as noted above, both during an actual OEI flight condition and during OEI flight procedures training), allowing the pilot to manually select any of the three OEI power ratings available from the single operative engine 12L, 12R. The switch assembly 127 includes a three-position select switch 128 that allows the pilot, during OEI flight operations, to manually select the 30-second power rating, the 2-minute power rating, or the maximum continuous OEI power rating by appropriate manual manipulation of the select switch 128 to a first position (depressed forward for the described embodiment of the select switch 128), a second position (depressed rearwardly for the described embodiment of the select switch 128), or a third position (neutrally centered for the described embodiment of the select switch 128), respectively. Manual manipulation of the select switch 128 to the first, second, or third position causes an appropriate control signal to be transmitted to the DECUs 18L, 18R that is indicative of selection of the 30-second power rating, the 2-minute power rating, or the maximum continuous OEI power rating, respectively. In response to such control signals, the appropriate DECU 18L, 18R is operative to reset the single operative engine 12L/12R to the appropriate OEI power rating so that the power output of the single operative engine 12L/12R is appositely limited.

Figure 4:
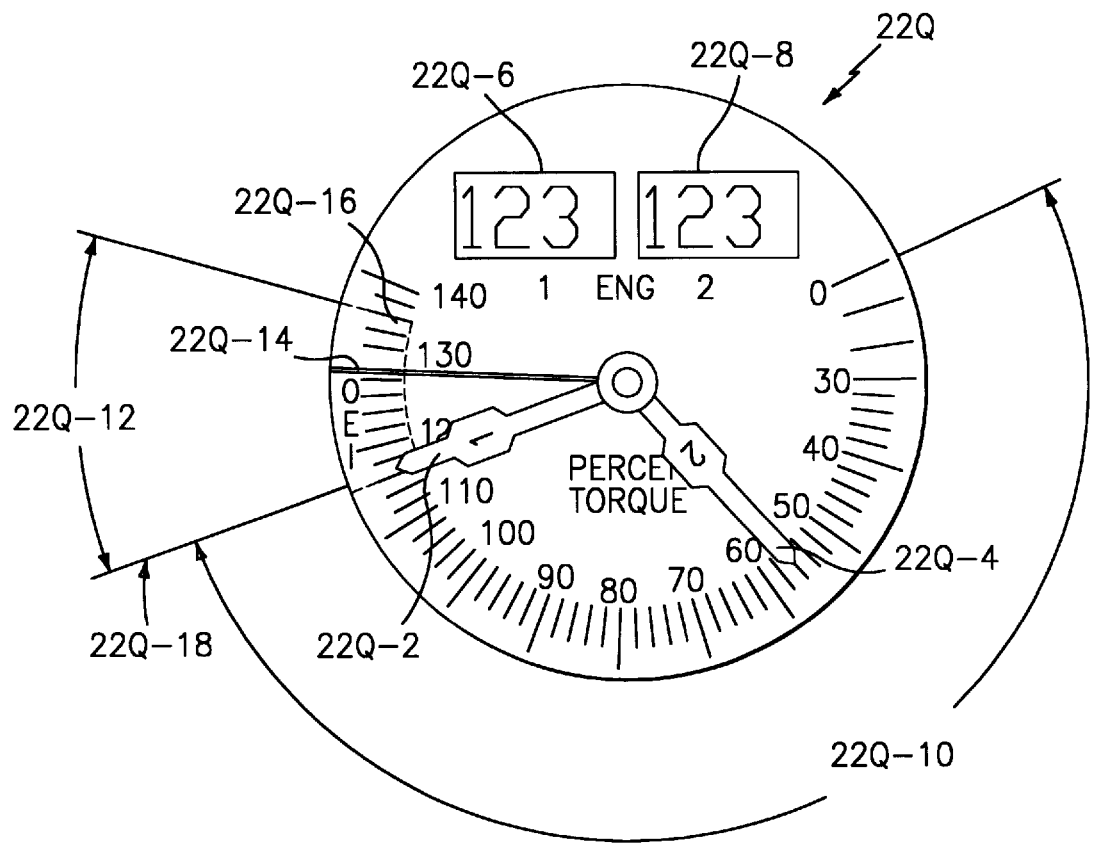
FIG. 4 is a detailed plan view of the configuration of an exemplary Q parametric indicator (torquemeter) for a helicopter cockpit instrument display system that functions as an OEI monitoring element for the exemplary powerplant system depicted in FIG. 1 during OEI flight operations.

Of interest for monitoring the status of the powerplant system 10 during OEI flight operations, and in particular, for monitoring the status of the powerplant system 10 during OEI flight procedures training using the system and method of the present invention as described in further detail hereinbelow, are the configurations of the parametric indicator $22N1_L$, $22N1_R$ for the parameter N1 and the parametric indicator $22Q_L$, $22Q_R$ for the parameter Q of the powerplant system 10 described hereinabove. Exemplary parametric indicators 22N1 and 22Q are illustrated in FIGS. 3 and 4 [since the parametric indicators $22N1_L$, $22N1_R$ and the parametric indicators $22Q_L$, $22Q_R$, respectively, have identical configurations and functional characteristics, the parametric indicator illustrated in FIG. 3 and the parametric indicator illustrated in FIG. 4 are identified by the reference characters "22N1" and "22Q" for simplicity].

The parametric indicator 22N1 is configured and operative to provide visual indications of the N1 parameter during dual-engine flight operations and during OEI flight operations, and in particular, during OEI flight procedures training. Referring to FIG. 3, the parametric indicator 22N1 includes a rotatable needle 22N1-2 that provides an analog display of the N1 parameter and a digital readout 22N1-4 that provides a digital display of the N1 parameter. The N1 parameter displays of the parametric indicator 22N1 are provided in response to sensor signals generated by the corresponding sensor $14N1_L/14N1_R$.

For OEI flight operations, the parametric indicator 22N1 comprises an expanded scale, OEI indicia 22N1-6 that defines the OEI precautionary operating range for the N1 parameter, with the lower limit 22N1-8 of the OEI indicia 22N1-6 defining the maximum continuous OEI power limit for the N1 parameter. The lower limit 22N1-8 of the OEI indicia 22N1-6 also defines the take off power limit for the N1 parameter. The parametric indicator 22N1 further includes a first OEI indicium 22N1-10 that defines the 2-minute OEI power limit for the N1 parameter, and a second OEI indicium 22N1-12 that defines the 30-second OEI power limit for the N1 parameter. A zone defined between the first OEI indicium 22N1-10 and the second OEI indicium 22N1-12 defines the 30-second OEI operating range for the N1 parameter, and a zone defined between the lower limit 22N1-8 of the OEI indicia 22N1-6 and the first OEI indicium 22N1-10 defines the 2-minute OEI operating range for the N1 parameter.

For the described embodiment of the parametric indicator 22N1 of the powerplant system 10 of the S-76C+ helicopter, the expanded scale, OEI indicia 22N1-6 is a colored arc segment (a yellow colored arc segment for the particular embodiment) that defines the OEI precautionary operating range from 100% N1 to 104.6% N1, the first OEI indicium 22N1-10 is a colored dashed line segment (a yellow dashed line segment for the particular embodiment) that defines the 2-minute OEI power limit of 101.2% N1, and the second OEI indicium 22N1-12 is a colored dashed line segment (a red dashed line segment for the particular embodiment) that defines the 30-second OEI power limit of 104.6% N1. The DECU 18L/18R functionally associated with the single operative engine 12L/12R is operative, during OEI flight operations, to implement protective logic routines (in the form of hardware, firmware, software, and/or combinations thereof) to automatically prevent the single operative engine 12L/12R from exceeding the 30-second OEI power rating, the 2-minute OEI power rating, or the maximum continuous OEI power rating, as applicable, during OEI flight operations.

For OEI flight operations, the parametric indicator 22N1 further comprises a first dedicated bi-colored lamp fixture 22N1-14 disposed in combination with the first OEI indicium 22N1-10 that defines the 2-minute OEI power limit for the N1 parameter and a second dedicated bi-colored lamp fixture 22N1-16 disposed in combination with the second OEI indicium 22N1-12 that defines the 30-second OEI power limit for the N1 parameter. For the described embodiment of the parametric indicator 22N1 for the S-76C+ aircraft, the first dedicated bi-colored lamp fixture 22N1-14 is centered on the outward radial end of the yellow dashed line segment 22N1-10 and the second dedicated bi-colored lamp fixture 22N1-16 is centered on the outward radial end of the yellow dashed line segment 22N1-12.

The illumination of the first and second dedicated bi-colored lamp fixtures 22N1-14, 22N1-16 is regulated by activation signals generated by the appropriate DECU 18L/18R in response to signals generated by the apposite sensor $14N1_L/14N1_R$ during OEI flight operations. These activation signals cause the first or second dedicated bi-colored lamp fixtures 22N1-14, 22N1-16 to illuminate in a first color when the 30-second OEI power rating or the 2-minute OEI power rating, respectively, is enabled for the single operative engine 12L/12R (as used herein, the "enabled" terminology indicates that the corresponding OEI power is "available" for usage, i.e., the appropriate DECU 18L/18R has reset the protective logic routine for the single operative engine 12R/12L to the appropriate OEI power rating, but further that the OEI power is not currently being used for OEI flight operations). These activation signals further cause the first or second dedicated bi-colored lamp fixtures 22N1-14, 22N1-16 to illuminate in a second color when the single operative engine 12L/12R is actually operating in the 30-second OEI operating range or the 2-minute OEI operating range, respectively. For the described embodiment of the parametric indicator 22N1 of the S-76C+ helicopter, the first color is green to indicate enablement and the second color is yellow to indicate usage.

In a representative OEI flight operation, e.g., a failure of one engine 12L/12R during a take off flight operation, the appropriate DECU 18L, 18R implements a protective logic routine that automatically causes the single operative engine 12R/12L to default to the 30-second power rating. Concomitantly, the appropriate DECU 18L/18R transmits an activation signal to the parametric indicator 22N1 of the single operative engine 12L/12R to cause the second bi-colored lamp fixture 22N1-16 to steadily illuminate in the first color, thereby alerting the pilot that the 30-second OEI power rating is enabled for the single operative engine 12L/12R.

Once the single operative engine 12R/12L has ramped up to operate within the 30-second OEI operating range, the appropriate DECU 18L/18R transmits an activation signal to the parametric indicator 22N1 of the single operative engine 12L/12R to cause the bi-colored lamp fixture 22N1-16 to steadily illuminate in the second color, thereby alerting the pilot that the single operative engine 12L/12R is operating under the 30-second OEI power rating. Concomitantly, the appropriate DECU 18L/18R initiates a 30-second timer to record operation of the single operative engine 12L/12R within 30-second OEI operating range.

A predetermined time prior to expiration of the 30-second OEI power period, the appropriate DECU 18L/18R causes the illuminated lamp fixture 22N1 16 to flash at a predetermined rate to alert the pilot that the 30-second OEI power period is about to expire. This visual warning allows the pilot to expeditiously manually manipulate the select switch 128 to the second position, thereby causing the appropriate DECU 18L/18R to reset the protective logic of the single operative engine 12R/12L to the 2-minute OEI power rating at or before the expiration of the 30-second OEI power period.

Concomitantly, the appropriate DECU 18L/18R transmits an activation signal to the parametric indicator 22N1 of the single operative engine 12L/12R to cause the first bi-colored lamp fixture 22N1-14 to steadily illuminate in the first color, thereby alerting the pilot that the 2-minute OEI power rating is enabled for the single operative engine 12L/12R. Once the single operative engine 12R/12L has ramped down to operate within the 2-minute OEI operating range, the appropriate DECU 18L/18R transmits an activation signal to the parametric indicator 22N1 of the single operative engine 12L/12R to cause the first bi-colored lamp fixture 22N1-14 to steadily illuminate in the second color, thereby alerting the pilot that the single operative engine 12L/12R is operating within the 2-minute OEI operating range. Concomitantly, the appropriate DECU 18L/18R initiates a 2-minute timer to record operation of the single operative engine 12L/12R within the 2-minute OEI operating range.

A predetermined time prior to expiration of the 2-minute OEI power period, the appropriate DECU 18L/18R causes the illuminated lamp fixture 22N1-14 to flash at a predetermined rate to alert the pilot that the 2-minute OEI power period is about to expire. This visual warning allows the pilot to expeditiously manually manipulate the select switch 128 to the third position, thereby causing the appropriate DECU 18L/18R to reset the protective logic of the single operative engine 12R/12L to the maximum continuous OEI power rating at or before the expiration of the 2-minute OEI power period.

Once the single operative engine 12R/12L has ramped down to or below the maximum continuous OEI operating limit established by the OEI indicium 22N1-10, the appropriate DECU 18L/18R extinguishes the first bi-colored lamp fixture 22N1-14. Neither the first nor the second bi-colored lamp fixture 22N1-14, 22N1-16 is illuminated during the period when the single operative engine 12R/12L is operated under the maximum continuous OEI power rating, the lack of illumination of either bi-colored lamp fixture 22N1-14, 22N1-16 providing a visual cue to the pilot that the single operative engine 12L, 12R is being operated under the maximum continuous OEI power rating.

For the described embodiment of the parametric indicator 22N1 for the S-76C+ helicopter, the predetermined time when the first and second bi-colored lamp fixtures 22N1-14, 16 switch over from steady illumination to flashing illumination is 3 seconds prior to expiration of the applicable OEI operating period, and the predetermined rate of flashing is 2.5 Hz.

The parametric indicator 22Q is configured and operative to provide visual indications of the Q parameter for each engine package 12L, 12R during dual-engine flight operations and during OEI flight operations, and in particular, during OEI flight procedures training. Referring to FIG. 4, the parametric indicator 22Q includes a first rotatable needle 22Q-2 that provides an analog display of the Q parameter for the first engine 12L, a second rotatable needle 22Q-4 that provides an analog display of the Q parameter for the second engine 12R, a first digital readout 22Q-6 that provides a digital display of the Q parameter for the first engine 12L, and a second digital readout 22Q-8 that provides a digital display of the Q parameter for the second engine 12R. The Q parameter displays of the parametric indicator 22Q are provided in response to sensor signals generated by the corresponding sensor $14Q_L$, $14Q_R$.

For OEI flight operations, the parametric indicator 22Q comprises a first OEI indicia 22Q-10 that defines the OEI normal operating range for the Q parameter and a second OEI indicia 22Q-12 that defines the OEI precautionary operating range for the Q parameter. A first indicium 22Q-14 defines the 2-minute OEI power limit for the Q parameter and a second indicium 22Q-16 defines the 30-second OEI power limit for the Q parameter. The second indicium 22Q-16 concomitantly defines the upper limit of the OEI precautionary operating range. The lower limit of the OEI precautionary operating range, identified by reference characters "22Q-18" in FIG. 4, defines the maximum continuous OEI power rating for the Q parameter. It will be appreciated that the OEI normal operating range for the Q parameter has a lower limit of 0% Q inasmuch as, during OEI flight operations, the inoperative engine may not be providing any power (torque) output.

For the described embodiment of the parametric indicator 22Q of the powerplant system 10 of the S-76C+ helicopter, the first OEI indicia 22Q-10 is a colored arc segment (a green arc segment for the particular embodiment) that defines the OEI normal operating range from 0% Q to 116% Q, the second OEI indicia 22Q-12 is a colored arc segment (a yellow arc segment for the particular embodiment) that defines the OEI precautionary operating range from 116% Q to 135% Q, the first OEI indicium 22Q-14 is a colored dashed line segment (a yellow dashed line segment for the particular embodiment) that defines the 2-minute OEI power rating of 127% Q, and the second OEI indicium 22Q-16 is a colored dashed line segment (a red dashed line segment for the particular embodiment) that defines the 30-second OEI power rating of 135% Q. The maximum continuous OEI power rating identified by the lower limit 22Q-18 of the second OEI indicia 22Q-12 that defines the OEI precautionary operating range is visually differentiated by the color dichotomy between the OEI precautionary operating range and the OEI normal operating range.

Prior to discussing the system and method for OEI flight procedures training according to the present invention, some rudimentary terminology is defined and/or discussed to facilitate a better appreciation of the system and method for OEI flight procedures training of the present invention. The acronym "WAT" stands for Weight-Altitude-Temperature. The flight manual for a helicopter includes an WAT curve and a rejected take off/continued take off distance curve that allow the pilot to establish an "allowable gross weight" and airfield length for the helicopter for dual-engine flight operations based upon selected variables such as ambient conditions expressed in terms of pressure altitude and temperature and a take off critical decision point (CDP)/take off safety speed ($V_{toss}$). By way of example, the maximum allowable gross weight for the S-76C+ helicopter is 11,700 pounds for dual-engine flight operations and the range of allowable gross weights for dual-engine flight operations is 7,350 pounds to 11,700 pounds.

The system and method for OEI flight procedures training according to the present invention employs a "training" WAT curve (see FIG. 8) for OEI flight operations that establishes "training gross weights" for OEI flight procedures training (versus allowable gross weights for dual-engine revenue flight operations). The training gross weights defined by the training WAT curve are correlated to the allowable gross weights (based upon a corresponding pressure altitude, temperature, and CDP/$V_{toss}$), but have a smaller magnitude than the corresponding allowable gross weights. For example, for the S-76C+ helicopter, the maximum training gross weight is 11,000 pounds for OEI flight procedures training and the range of training gross weights for OEI flight procedures training is 7,000 pounds to 11,000 pounds (depending upon the specific values of variables such as pressure altitude, temperature, and $V_{toss}$). The training gross weights defined by the training WAT curve are established to provide a high degree of realism, i.e., simulation of operation at allowable gross weights, during OEI flight procedures training while providing an appreciable margin of safety as a result of the reduced flying weight, i.e., the training gross weight, of the helicopter during OEI flight procedures training.

The terminology "actual" when used in the context of OEI power ratings during OEI flight procedures training refers to the power output available for flight operations and/or the magnitude of the parametric displays for each OEI power rating, i.e., 30-second OEI power rating, 2-minute OEI power rating, and maximum continuous OEI power rating, implemented during a real OEI flight operation. In contrast, the terminology "suppressed" when used in the context of OEI power ratings refers to reduced power ratings that are provided by the engines during OEI flight procedures training.

Referring to FIG. 1, a system 200 for OEI flight procedures training in a dual-engine helicopter according to the present invention includes the primary functional features and characteristics of the exemplary dual-engine powerplant system 10 and the selected elements functionally integrated in combination with the dual-engine powerplant system 10 as described in the preceding paragraphs. Since the system 200 includes the actual functional features and characteristics that are utilized during actual OEI flight operations, the system 200 provides a high degree of realistic, yet safe, OEI flight procedures training at reduced gross weight (training gross weight) and reduced dual-engine power outputs (suppressed OEI limits) by utilizing the primary control functions described in the preceding paragraphs that are available for actual OEI flight operations including single engine operative functions such as the enable/usage lights of the parametric indicator 22N1, the OEI duration timing functions provided by the DECUs 18L, 18R (timing for the 30-second OEI operating period and the 2-minute OEI operating period), three-position OEI switch assembly 127 that provides the capability to manually select the 30-second OEI power rating, the 2-minute OEI power rating, or the maximum continuous OEI power rating, and the 30-second OEI power rating default logic implemented by the DECUs 18L, 18R.

One notable exception with respect to the functional features and characteristics of the system 200 is that the engine out warning lights (not shown) for the left and right engine packages 12L, 12R are not available during OEI flight procedures training using the system according to the present invention. Use of the engine out warning lights is limited to actual OEI flight conditions so that the pilot will be provided with a timely warning if an actual OEI condition occurs during OEI flight procedures training.

Figure 5:
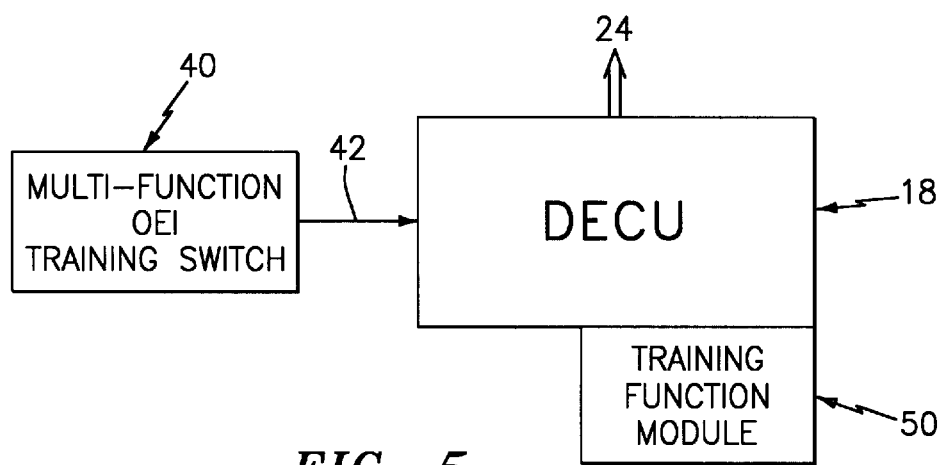
FIG. 5 is a schematic block diagram illustrating features of a system for conducting OEI flight procedures training in a dual-engine helicopter that are specific to the OEI flight procedures training protocol.

The system 200 also includes certain functional features that are operative only during OEI flight training procedures. Referring to FIG. 5, which illustrates a generic DECU 18 [since the DECUs 18L, 18R embody equivalent functional features and characteristics, the following description is presented in terms of a generic DECU 18 for simplicity], the system 200 according to the present invention further comprises a multi-function OEI training switch 40 that is electrically interconnected to the DECU 18 by a signal line 42. The multi-function OEI training switch means 40 is operative, inter alia, to allow an instructor pilot to select either the left engine 12L or the right engine 12R for a simulated failure, which concomitantly defines the other engine 12L/12R as the single operative engine, during OEI flight training procedures (the multi-function OEI training switch 40 includes a further functional capability that is not relevant to the instant application, and accordingly, is not described herein].

The system 200 further includes a training function module 50, which in the described embodiment is a functional segment of the DECU 18, that is operative to: (1) establish suppressed OEI operating limits or ratings for selected engine operating parameters that limit the actual power output of the engine packages 12L, 12R during OEI flight training procedures; and (2) generate biasing factors to control the operation of the parametric indicators of the cockpit instrument display system 22 for the selected engine operating parameters wherein the selected OEI parameters displayed by the respective parametric indicators of the cockpit instrument display system 22 are indicative of actual OEI flight conditions even though the engines 12L, 12R are operating at suppressed (reduced) power ratings. The training function module 50 can be implemented by means hardware, firmware, software, or combinations thereof (in the described embodiment, the training function module 50 is implemented as software routines loaded in the DECU 18).

To accomplish the function of establishing suppressed OEI ratings for the selected engine operating parameters for effecting OEI flight procedures training, which for the described embodiment of the training function module 50 for the S-76C+ helicopter are the engine gas generator speed parameter N1 and the engine torque parameter Q, the training function module 50 is operative to first define primary constraints for the operation of the dual-engine powerplant system 10 for OEI flight training procedures to ensure that the engine packages 12L, 12R are not subjected to damage during OEI flight procedures training. For the described embodiment of the training function module 50, the primary constraints include: (1) logic prohibiting either engine 12L, 12R from exceeding the maximum continous OEI power rating during OEI flight training procedures; and (2) logic prohibiting either engine 12L, 12R from exceeding 100% actual Q.

The training function module 50 is then operative to define a suppressed OEI limit or rating for the parameter N1 for 2-minute OEI flight procedures training using the system 200. Aviation regulatory authorities have established climb performance minima for OEI flight operations and the suppressed 2-minute OEI N1 limit that is established for the system 200 according to the present invention is based upon such defined climb performance minima. For example, FAR/JAR-29 Category A climb performance minima have been established at 100 feet/minute rate-of-climb (ROC) at 200 feet above the take off surface using 2-minute power over a range of $V_{toss}$ with the landing gear extended or 150 feet/minute ROC at 1000 feet above the take off surface using maximum continuous OEI power at $V_y$(best rate-of-climb).

Figure 6A:
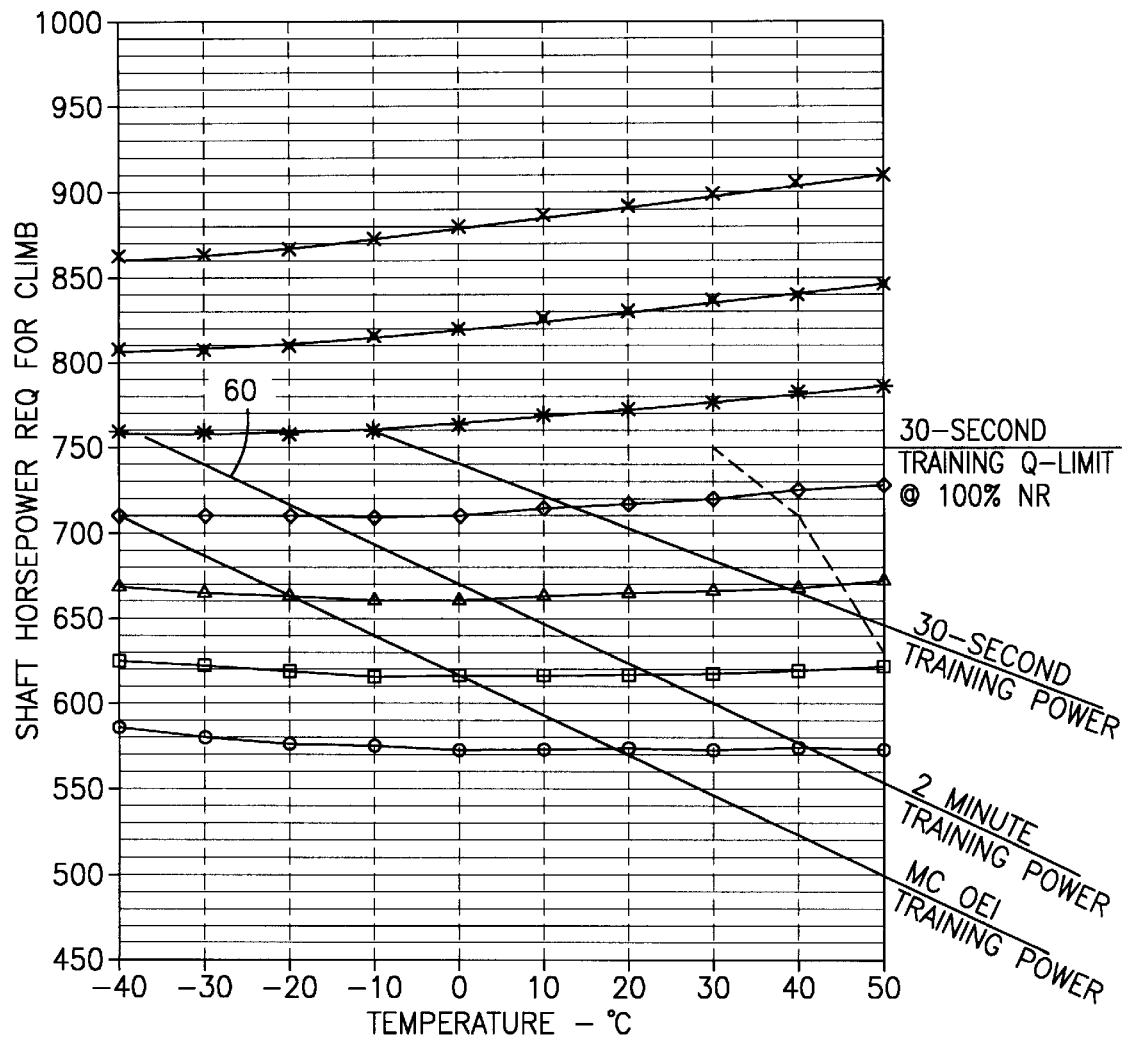
FIGS. 6A, 6B, 6C are graphs illustrating exemplary performance curves, at different values of $V_{TOSS}$, for the suppressed 30-second, 2-minute and, maximum continuous OEI power limits.
Figure 6B:
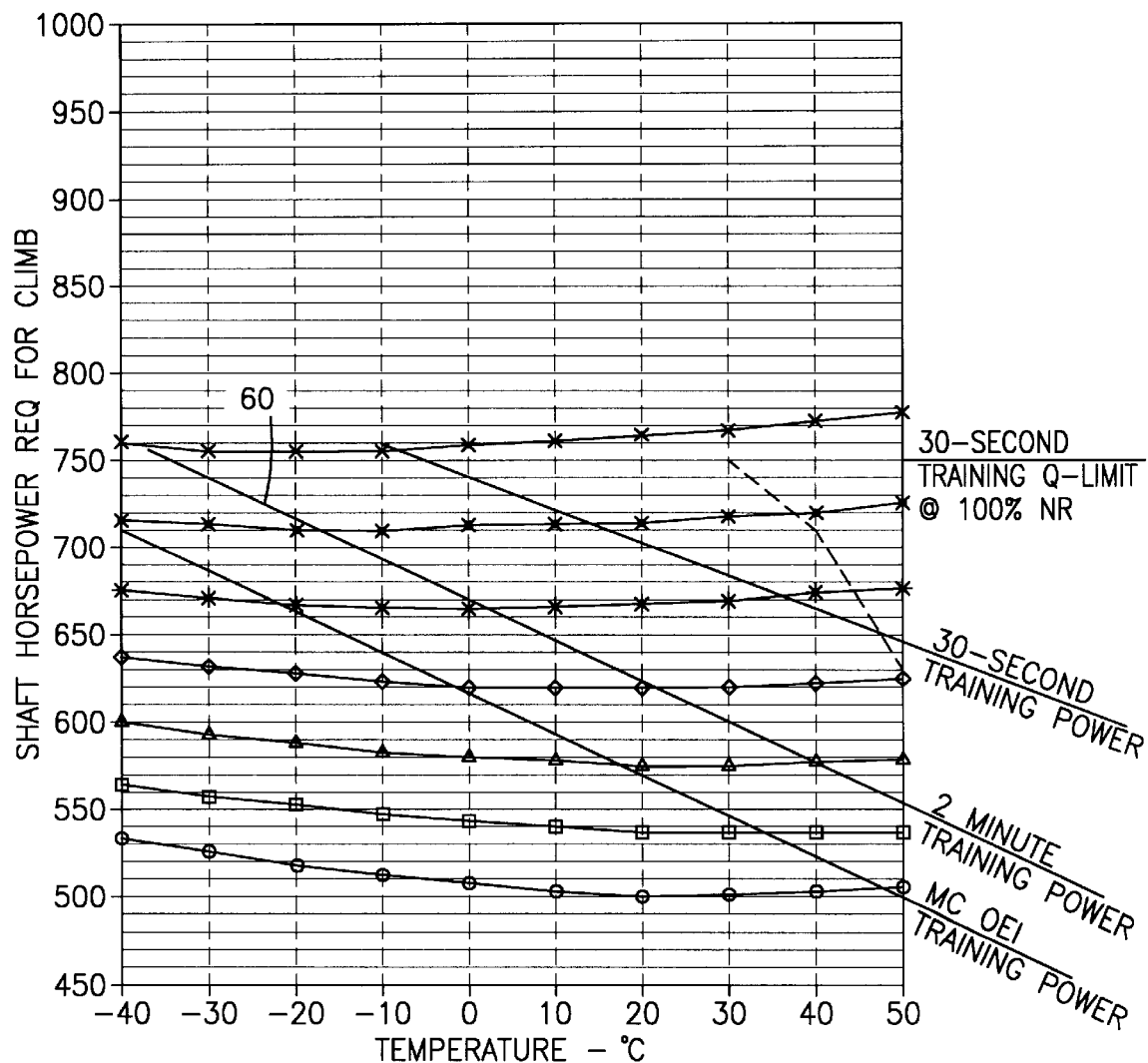
Figure 6C:
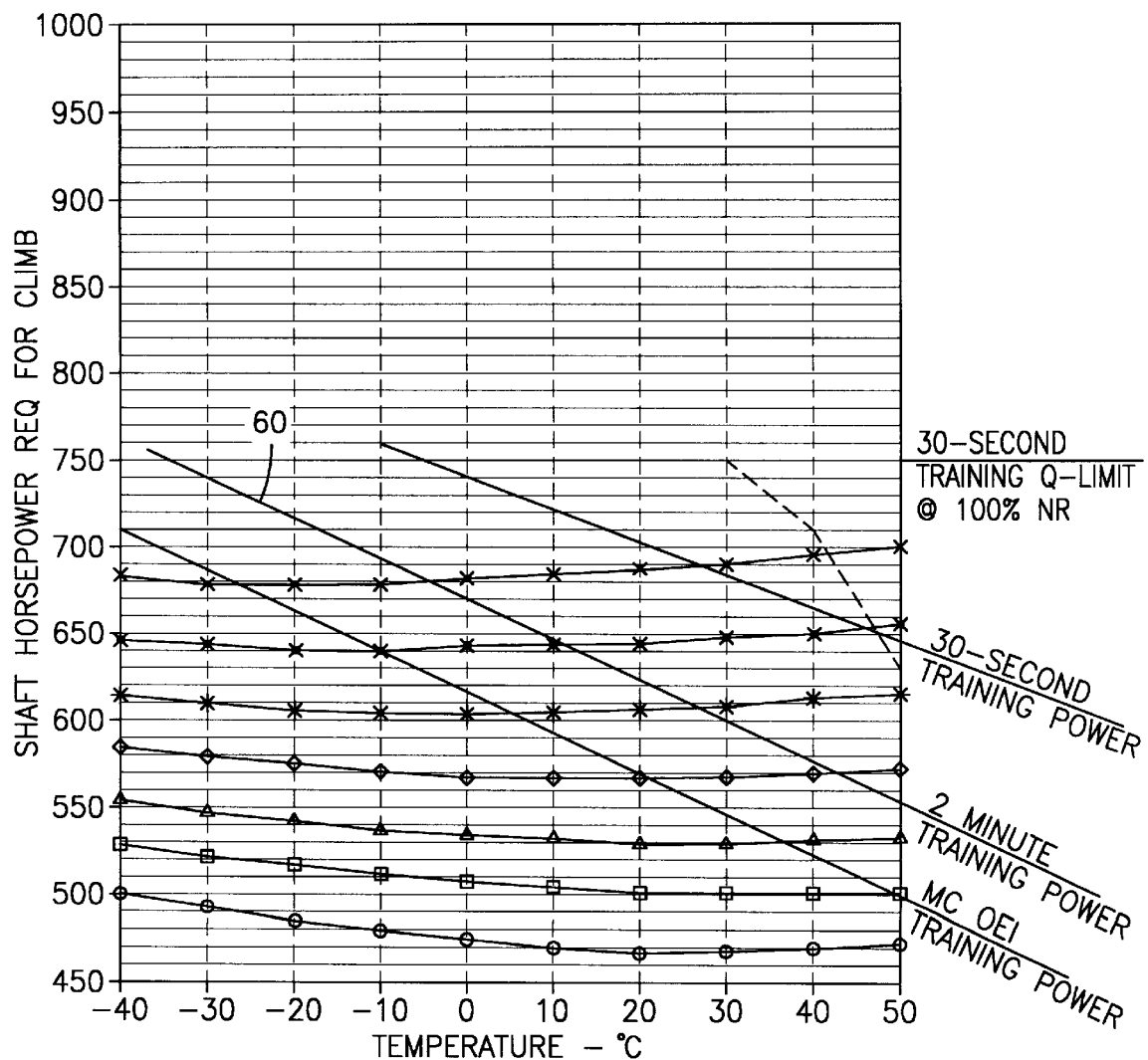

For the described embodiment of the system 200 for the S-76C+ helicopter, the 2-minute OEI suppressed N1 limit was established by climb performance analyses wherein specific performance points, where each performance point defines a specific suppressed 2-minute OEI N1 limit, based upon such climb performance minima were calculated, and then, based upon such calculated performance points, a performance curve of suppressed 2-minute OEI N1 limits was defined. For example, for the described embodiment of the S-76C+ helicopter, specific performance points were set based upon a power rating of 200 SHP (26.66% Q at 100% $N_R$) less than the maximum continuous OEI power rating (see disclosure hereinabove) at 0° C. and a power rating of 120 SHP (16.00% Q at 100% NR) less than the maximum continuous OEI power rating at 40° C. Based upon these computed performance points, with linear variations elsewhere, a performance curve of suppressed 2-minute OEI N1 limits was defined. Several exemplary climb performance analyses resulted in the graphs exemplarily illustrated in FIGS. 6A, 6B, 6C for Vtoss values of 40, 50 and 60 knots, respectively, wherein the performance curve of suppressed 2-minute OEI N1 limits is identified by the reference numeral "60" (corresponding performance curves for the suppressed 30-second OEI N1 limit and the suppressed maximum continuous OEI N1 limit are also illustrated in FIGS. 6A, 6B, 6C—these performance curves were established based upon the computations described in the paragraphs hereinbelow). For the preferred embodiment of the training function module 50, the performance curves for the suppressed 30-second OEI limit, the suppressed 2-minute OEI N1 limit and the suppressed maximum continuous OEI N1 limit are formatted as look-up tables. Using selected variables to enter the performance curve of suppressed 2-minute OEI N1 limits of the appropriate graph (or look-up table), a specific suppressed 2-minute OEI N1 limit is determined for OEI flight procedures training.

Once the suppressed 2-minute OEI N1 rating is established, the training function module 50 is operative to establish a suppressed 30-second OEI N1 limit for OEI flight procedures training using the system 200. First, the value of the ratio of the actual 30-second OEI power rating to the actual 2-minute OEI power rating is determined. Then the calculated value of the ratio is multiplied by the suppressed 2-minute OEI N1 rating to establish the suppressed 30-second OEI N1 limit. That is, $$\frac{\text{actual 30-second } OEI \text{ power rating}}{\text{actual 2-minute } OEI \text{ power rating}} \approx \frac{\text{suppressed 30-second } OEI\,N1 \text{ limit}}{\text{suppressed 2-minute } OEI\,N1 \text{ limit}} \qquad \text{Eq. 1}$$

In a similar manner, the training function module 50 is operative to establish a suppressed maximum continuous OEI N1 limit. That is, the value of the ratio of the actual 2-minute OEI power rating to the actual maximum continuous (MC) OEI power rating is determined. Then the suppressed 2-minute OEI N1 limit is divided by the calculated value of the ratio to establish the suppressed maximum continuous OEI N1 limit. That is, $$\frac{\text{actual 2-minute } OEI \text{ power rating}}{\text{actual } MC \text{ } OEI \text{ power rating}} \approx \frac{\text{suppressed 2-minute } OEI\,N1 \text{ limit}}{\text{suppressed } MC \text{ } OEI\,N1 \text{ limit}} \qquad \text{Eq. 2}$$

The suppressed maximum continuous OEI N1 limit that is established as described immediately hereinabove corresponds to the dual-engine N1 take off limit for training purposes (analogous to the design and OEI power ratings wherein the maximum continuous OEI power rating for the N1 parameter corresponds to the dual-engine take off power rating for the N1 parameter).

Numerical values for the suppressed 30-second, 2-minute, and maximum continuous OEI N1 limits, as calculated by the training function module 50, are stored in the training function module 50 and implemented by means of control signals generated by the appropriate DECU 18L, 18R during OEI flight procedures training.

The training function module 50 is further operative to establish values for the corresponding suppressed Q limits for use in the system 200 during OEI flight training procedures. In one preferred computational methodology, the suppressed 30-second OEI Q limit, the suppressed 2-minute OEI Q limit, and the suppressed maximum continuous OEI Q limit are established as predetermined percentages of the actual torque generated by the engines 12L, 12R operating at the suppressed 30-second OEI N1 limit, the suppressed 2-minute OEI N1 limit, and the suppressed maximum continuous OEI N1 limit, respectively, as described in the preceding paragraphs. In view of the primary constraint discussed hereinabove with respect to actual Q, the suppressed 30-second OEI Q limit is established at a predetermined percentage of 100% of the actual torque Q developed by the engines 12L, 12R. The predetermined percentages for the suppressed 2-minute and maximum continuous OEI Q limits are based upon the ratios of the actual 30-second OEI Q limit to the actual 2-minute OEI Q limit and the actual 30-second OEI Q limit to the actual maximum continuous OEI Q limit, respectively.

For the described embodiment of the training function module 50 for the S-76C+ aircraft, the suppressed 30-second OEI Q limit was established at 100% of the actual torque generated by the engines 12L, 12R, the suppressed 2-minute OEI Q limit was established at 94% of the actual torque generated by the engines 12L, 12R, and the suppressed maximum continuous OEI Q limit was established at 81.4% of the actual torque generated by the engines 12L, 12R.

Numerical values for the suppressed 30-second, 2-minute, and maximum continuous OEI Q limits, as calculated by the training function module 50, are stored in the training function module 50 and implemented by means of control signals generated by the appropriate DECU 18L, 18R during OEI flight procedures training.

The training function module 50 computes bias factors for the parametric indicator 22N1 of the cockpit instrument display system 22 for the selected operative engine 12L/12R that are based upon the actual 30-second, 2-minute, and maximum continuous OEI power ratings established for a dual-engine helicopter. During OEI flight procedures training, a first bias factor is established for OEI flight procedures training conducted utilizing the suppressed 30-second OEI N1 limit such that, when the helicopter is being operated at the suppressed 30-second OEI N1 limit, the first bias factor causes the parametric indicator 22N1 of the cockpit instrument display system 22 for the selected operative engine 12L/12R to display an indication indicative of the actual 30-second OEI power limit of the N1 parameter. In a similar manner, second and third bias factors are established for OEI flight procedures training utilizing the suppressed 2-minute and maximum continuous OEI N1 limits such that, when the helicopter is being operated at the suppressed 2-minute and maximum continuous OEI N1 limits, respectively, the second and third bias factors cause the parametric indicator 22N1 of the cockpit instrument display system 22 for the selected operative engine 12L/12R to display indications indicative of the actual 2-minute and maximum continuous OEI power limits of the N1 parameter, respectively.

For example, for the described embodiment of training function module 50 for the S-76C+ helicopter, the first bias factor causes the parametric indicator 22N1 of the cockpit instrument display system 22 for the selected operative engine 12L/12R to display an N1 value of 104.6% (the actual 30-second OEI power limit for the S-76C+ helicopter) when the helicopter is being operated at the suppressed 30-second OEI N1 limit (as previously established as discussed hereinabove). In a similar manner, the second and third bias factors cause the parametric indicator 22N1 of the cockpit instrument display system 22 for the selected operative engine 12L/12R to display an N1 value of 101.2% (the actual 2-minute OEI power limit for the S-76C+ helicopter)

and 100% (the actual maximum continuous OEI power limit for the S-76C+ helicopter) when the helicopter is being operated at the suppressed 2-minute OEI N1 limit and the suppressed maximum continuous OEI N1 limit, respectively (as previously established by the procedures discussed hereinabove).

The first, second, and third bias factors for the suppressed 30-second, 2-minute, and maximum continuous OEI N1 limits, as calculated by the training function module 50, are stored in the training function module 50 and implemented by means of control signals generated by the appropriate DECU 18L, 18R during OEI flight procedures training to selectively bias the parametric indicator 22N1 of the cockpit instrument display system 22 for the selected operative engine 12L/12R to display N1 indications indicative of the actual 30-second, 2-minute, and maximum continuous OEI power ratings for the parameter N1, as apposite, during OEI flight procedures training.

Based upon the suppressed 30-second, 2-minute, and maximum continuous OEI Q limits computed by the training function module 50 as discussed hereinabove, the training function module 50 establishes a single bias factor for the parametric indicator 22Q of the cockpit instrument display system 22 for OEI flight procedures training having a numerical value that is based upon the actual 30-second OEI power limit of the Q parameter. During OEI flight procedures training, the single bias factor causes the parametric indicator 22Q for the selected operative engine 12L/12R to display indications indicative of the actual 30-second, 2-minute, and maximum continuous OEI power limits of the Q parameter when the helicopter is being operated at the suppressed 30-second, , 2-minute, and maximum continuous OEI Q limits, respectively.

For the described embodiment of the training function module 50 for the S-76C+ helicopter, the single bias factor has a numerical value of 1.35 for OEI flight procedures training. Implementation of this single bias factor causes the parametric indicator 22Q of the cockpit instrument display system 22 for the selected operative engine 12L/12R to display a Q value of 135% (the actual 30-second OEI power rating of the Q parameter) even though the suppressed 30-second OEI Q limit is 100% of the actual torque. Similarly, implementation of this single bias factor causes the parametric indicator 22Q of the cockpit instrument display system 22 for the selected operative engine 12L/12R to display a Q value of 127% (the actual 2-minute OEI power rating of the Q parameter) even though the suppressed 2-minute OEI Q limit is 94% of the actual torque and to display a Q value of 116% (the actual maximum continuous OEI power rating of the Q parameter) even though the suppressed maximum continuous OEI Q limit is 81.4% of the actual torque.

The single bias factor for the suppressed 30-second, 2-minute, and maximum continuous OEI Q limits, as computed by the training function module 50, is stored in the training function module 50 and implemented by means of control signals generated by the appropriate DECU 18L, 18R during OEI flight procedures training to selectively bias the parametric indicator 22Q of the cockpit instrument display system 22 for the selected operative engine to display Q indications indicative of the actual 30-second, 2-minute, and maximum continuous OEI power ratings for the Q parameter, as apposite, during OEI flight procedures training.

In addition to the primary control functions provided by the training Ad; function module 50 as described in the preceding paragraph, the training function module 50 also provides various ancillary control functions as part of the OEI flight procedures training protocol. The training function module 50 is operative to establish a dual-engine bias factor for the Q parameter that is implemented immediately prior to initiating OEI flight procedures training with the dual-engine helicopter operating in a hover condition. Since OEI flight procedures training is conducted with the dual-engine helicopter loaded to an applicable "training gross weight" (as opposed to the corresponding "allowable gross weight"), the dual-engine bias factor causes the parametric indicator 22Q to provide display indications for the parameter Q that are indicative of the engine torque required to hover at the corresponding "allowable gross weight". This provides the pilot with a high degree of realism with respect to the hover condition immediately prior to initiating an OEI flight procedures training take off maneuver. For the described embodiment of the training function module 50 for the S-76C+ helicopter, the dual-engine bias factor for the Q parameter has a value of 1.3.

The training function module 50 is operative, in response to an OEI condition, i.e., an actual engine failure, to immediately exit the OEI flight procedures training protocol. The suppressed 30-second, 2-minute, and maximum continuous OEI power limits for the N1, Q parameters are removed, i.e., no longer govern operation of the engines 12L, 12R, and the actual 30-second, 2-minute, and maximum continuous OEI power limits are set. The single operative engine 12L/12R is automatically accelerated to the apposite actual OEI power limit by the appropriate DECU 18L, 18R.

The training function module 50 is further operative to govern the simulated-failed engine 12L/12R at the minimum power turbine speed N2 for the minimum power-on transient $N_R$ established for the powerplant system 10. For the described embodiment of the S-76C+ helicopter, the simulated-failed engine 12L/12R is maintained at 91% N2. The simulated-failed engine 12L/12R can be accelerated to full power within two seconds from this governed condition in the event of an OEI condition or if selected by the instructor pilot. The simulated-failed engine 12L/12R will be maintained at 91% N2 during the OEI flight procedures training protocol, but has the capability, under the control of the training function module 50, to provide full power in the event of an abusive maneuver during OEI flight procedures training where excessive rotor droop, i.e., a precipitous fall off in main rotor speed $N_R$, is encountered.

The training function module 50 is further operative to preclude enablement of the OEI flight procedures training protocol unless selected after powerplant system 10 start with the engines 12L, 12R operating normally in the fly position. The training function module 50 is also operative to inhibit or exit OEI flight procedures training in the presence or occurrence of certain engine control faults (such faults may vary by helicopter manufacturer, and in consequence, are not specifically enumerated herein) or inappropriate control inputs introduced by the pilot.

The training function module 50 is also operative to provide dual engine simulation of the actual 30-second and 2-minute OEI power ratings. The training function module 50 generates command signals that suppress the limits of the parameter N1 of both engines 12L, 12R of the powerplant system 10 and cause the power output of each engine 12L, 12R to be restricted to exactly one-half of the specification value of the actual 30-second and 2-minute OEI power ratings, respectively.

Figure 7:
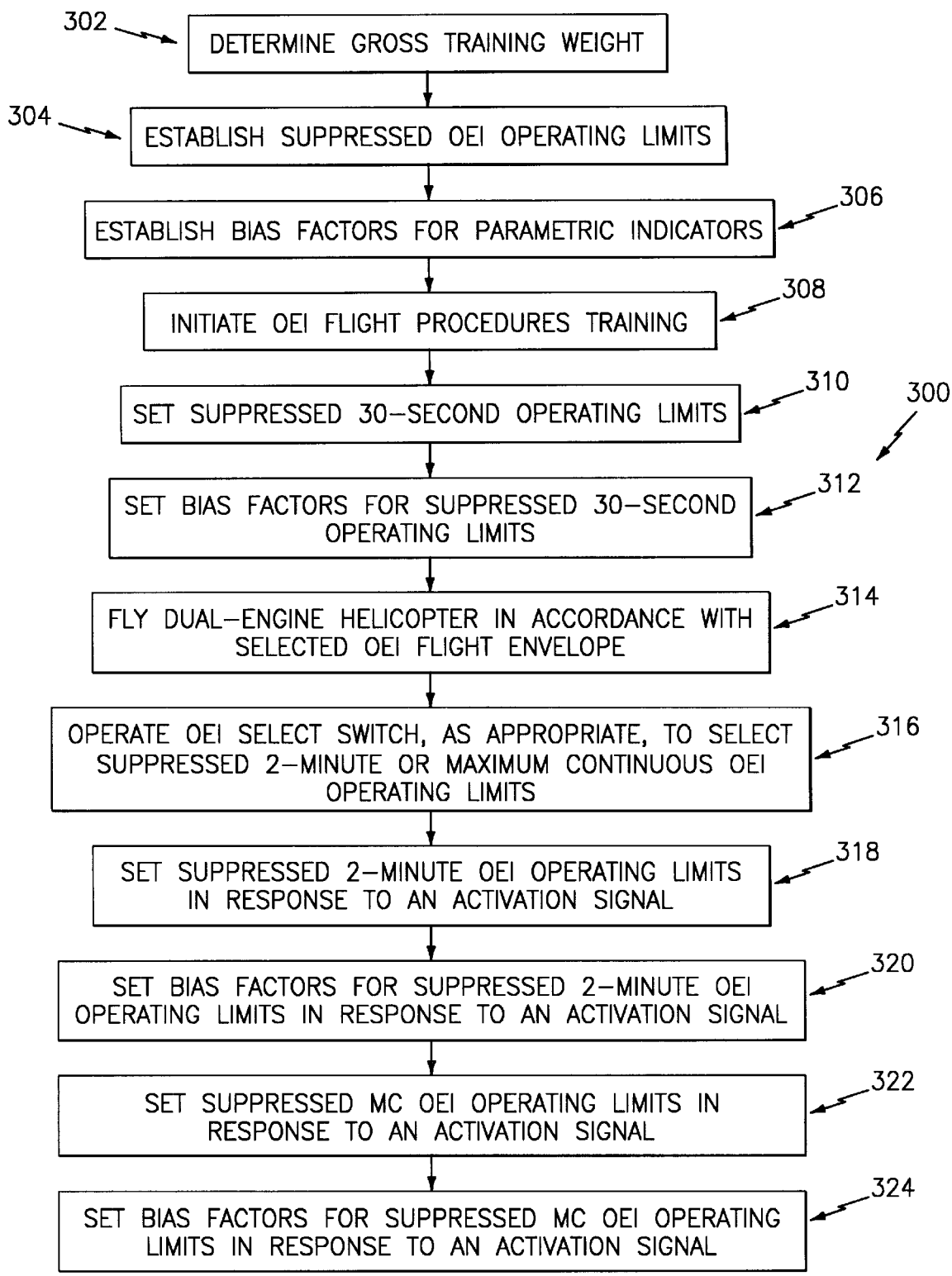
FIG. 7 illustrates a method for conducting OEI flight procedures training using the system according to the present invention.
Figure 8:
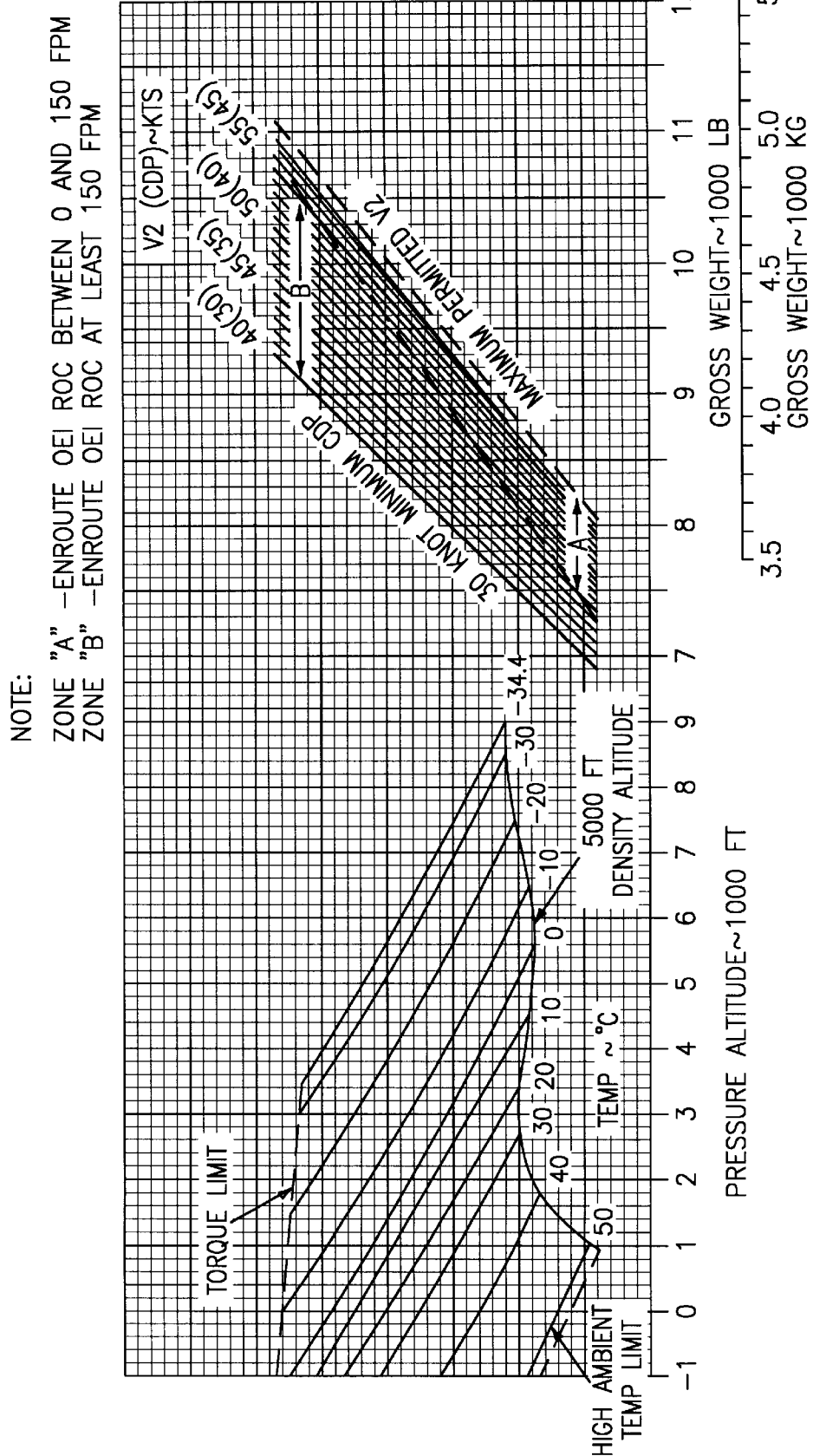
FIG. 8 is a graph illustrating an exemplary training WAT curve for use by the system in implementing OEI flight procedures training.

A method 300 according to the present invention for conducting OEI flight procedures training utilizing the system 200 described in the preceding paragraphs is exemplarily illustrated in FIG. 7 and described in further detail in the following paragraphs. In a first step 302, a training gross weight is determined for OEI flight training procedures for a dual-engine helicopter to be conducted using the system 200 according to the present invention. Referring to FIG. 8, an exemplary representation of a WAT training curve, the apposite training gross weight is determined by entering the graph with known values for the variables pressure altitude, temperature, and $V_2$ ($V_2$ is equivalent to $V_{toss}$, the take off safety speed). While the WAT training curve is depicted herein in a graphical format, it will be appreciated that the WAT training curve can be formatted as a look-up table that can be accessed by the training function module 50 using the known values of the variables to determine the apposite training gross weight.

In a step 304, suppressed OEI operating limits or ratings for selected engine operating parameters are established that define the reduced power outputs provided by the powerplant system 10 during OEI flight procedures training. As described hereinabove, suppressed 30-second, 2-minute, and maximum continuous OEI operating limits are established for the engine operating parameters N1 and Q by means of the computational procedures implemented by the training function module 50 as described hereinabove.

In a step 306, bias factors for the parametric indicators of the cockpit display system for the selected engine operating parameter, e.g., the parameters N1, Q, are established by means of the computational procedures implemented by the training functional module 50 as described hereinabove. The bias factors are operative to cause the parametric indicators 22N1, 22Q to display indications indicative of engine operation under actual OEI power ratings, even though the powerplant system 10 is operating at a reduced power output as defined by the suppressed OEI operating limits.

In a step 308, OEI flight procedures training is initiated by operating the multi-function OEI training switch 40 to select one engine 12L/12R of the powerplant system 10 as the simulated-failed engine 12L/12R (such a selection automatically defines the other engine 12R/12L as the single operative engine 12R/12L for OEI flight procedures training). Concomitantly, the training function module 50 is operative to automatically set the suppressed 30-second OEI operating limits for the parameters N1, Q for regulation of the power output of the powerplant system 10 in a step 310, and, in step 312, to simultaneously set the bias factors for the parametric indicators 22N1, 22Q of the cockpit instrument display system 22 for OEI flight procedures training under the suppressed 30-second OEI operating limits wherein the parametric indicators 22N1, 22Q provide display indications indicative of the actual 30-second OEI power ratings for the parameters N1, Q.

In a step 314, the helicopter is flown in accordance with a selected OEI flight envelope. For example, an OEI flight training procedure may be selected to simulate an OEI condition during the take off flight profile. The flight manual for any given dual-engine helicopter establishes a flight envelope for take off procedures conducted during an OEI condition, i.e., the OEI flight envelope.

In a step 316, during flight in accordance with the selected OEI flight envelope, the three-position OEI select switch 128 of the three-position OEI switch assembly 127 is manually manipulated, as appropriate, to select the suppressed 2-minute and maximum continuous OEI operating limits for the parameters N1 and Q. For example, once the dual-engine helicopter reaches $V_{toss}$ during the OEI flight envelope, the select switch 128 is operated to select the suppressed 2-minute OEI operating limits. Once the helicopter reaches a safe cruising altitude, or the 2-minute OEI operating period is about to expire, the select switch 128 is operated to select the suppressed maximum continous OEI operating limits. The select switch 28 generates first and second activation signals to indicate that the suppressed 2-minute or maximum continuous OEI operating limits, respectively, has been selected.

In a step 318, in response to selection of the suppressed 2-minute OEI limits for the parameters N1, Q by means of the three-position OEI select switch 128, i.e., in response to the first activation signal, the training function module 50 is operative to set the suppressed 2-minute OEI operating limits for the parameters N1, Q to reduce the power output provided by the powerplant system 10 to that prescribed by the suppressed 2-minute OEI operating limits.

Simultaneously, in a step 320, in response to the selection of the suppressed 2-minute OEI operating limits for the parameters N1, Q, i.e., in response to the first activation signal, the training function module 50 is operative to set the bias factors for the parametric indicators 22N1, 22Q of the cockpit instrument display system 10 for OEI flight procedures training under the suppressed 2-minute OEI power limit wherein the parametric indicators 22N1, 22Q provide display indications indicative of the actual 2-minute OEI power ratings for the parameters N1, Q.

In a step 322, in response to selection of the suppressed maximum continuous OEI operating limits for the parameters N1, Q, i.e., in response to the second activation signal, the training function module 50 is operative to set the suppressed maximum continuous OEI operating limits for the parameters N1, Q to reduce the power output provided by the powerplant system 10 to that prescribed by the suppressed maximum continuous OEI operating limits.

And finally in step 324, in response to the selection of the suppressed maximum continuous OEI operating limits for the parameters N1, Q, i.e., in response to the second activation signal, the training function module 50 is operative to set the bias factors for the parametric indicators 22N1, 22Q of the cockpit instrument display system 10 for OEI flight procedures training under the suppressed maximum continuous OEI operating limits wherein the parametric indicators 22N1, 22Q provide display indications indicative of the actual maximum continuous OEI power ratings for the parameters N1, Q.

Figure 9A:
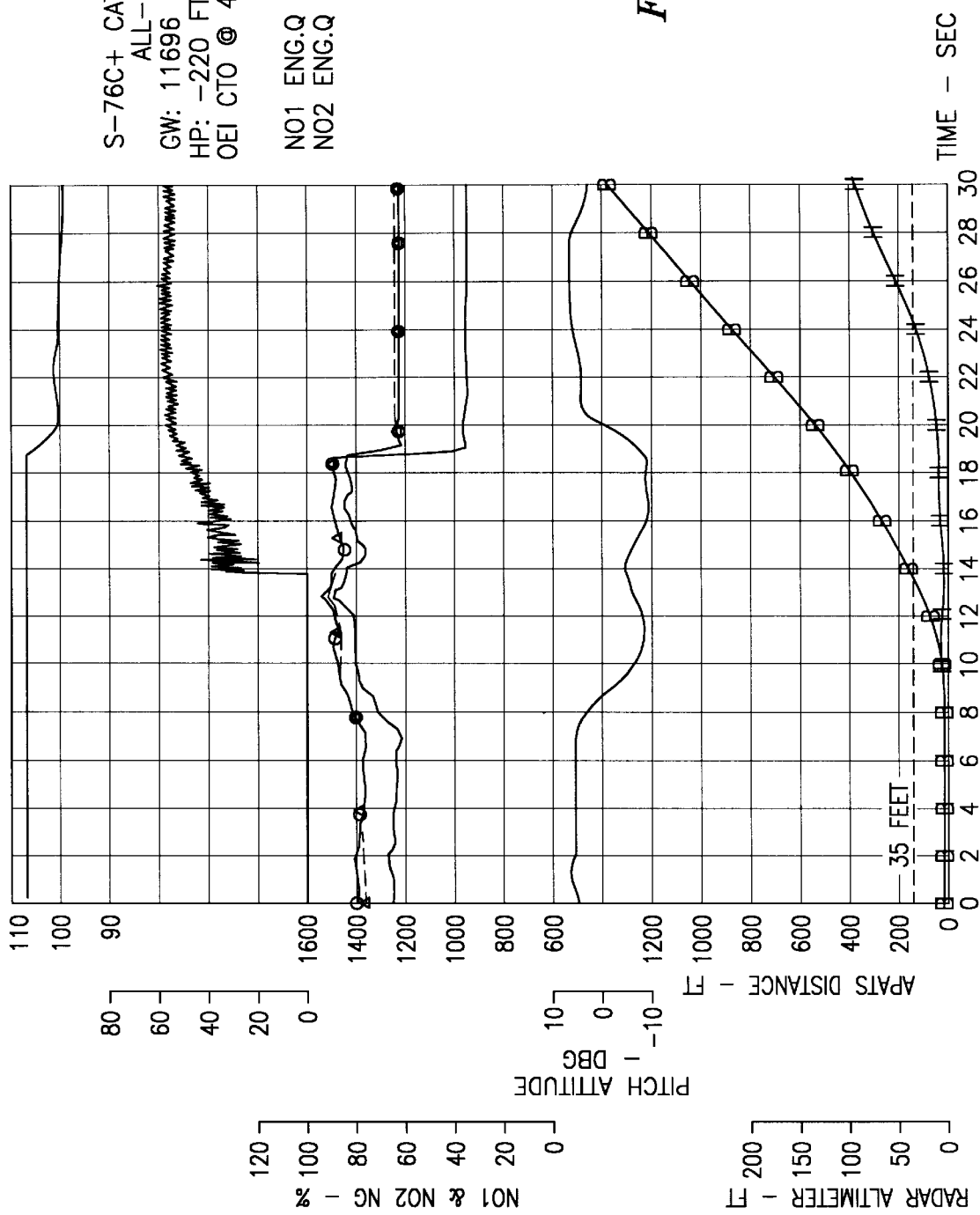
FIG. 9A depicts selected parameters for an S-76C+ helicopter conducting a Category "A" airfield take off maneuver using two engines to simulate the actual 30-second OEI power ratings.
Figure 9B:
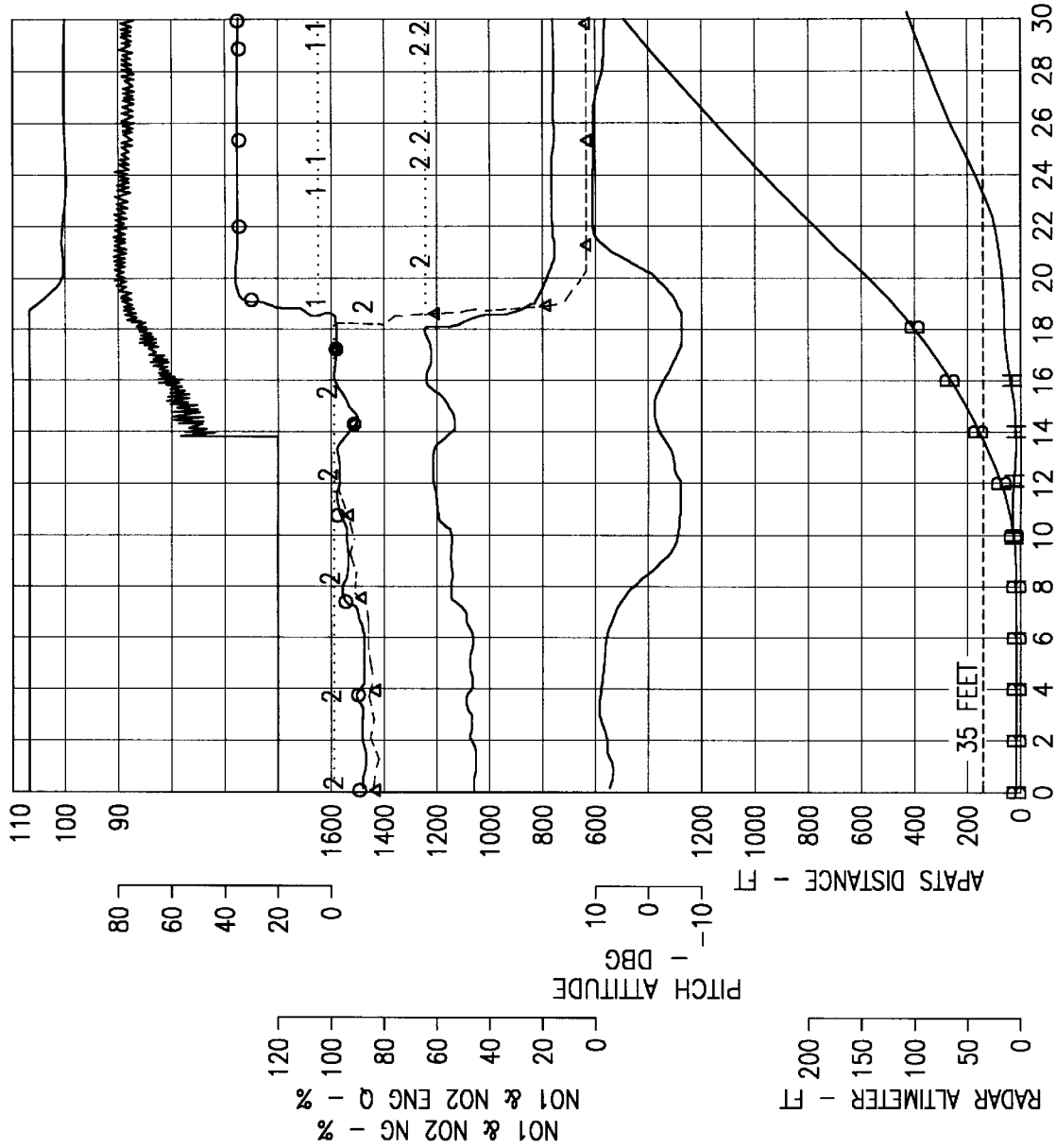
FIG. 9B depicts selected parameters for an S-76C+ helicopter conducting the same category "A" airfield take off maneuver using the suppressed 30-second OEI operating limits.

The high degree of realism provided by the system 200 and method 300 according to the present invention for conducting OEI flight procedures training in a dual-engine helicopter, as described hereinabove, may be readily appreciated by an examination of FIGS. 9A, 9B. FIG. 9A illustrates the actual display indications of selected operating parameters for an S-76C+ helicopter conducting a Category "A" airfield OEI continued take off maneuver performed at a 45 knot TDP (take off decision point—limiting speed required to continue the take off maneuver during OEI flight operations)/55 knot $V_{toss}$, at the maximum allowable gross weight of 11,700 pounds using two engines to simulate the actual 30-second OEI power rating. FIG. 9B depicts the actual display indications of selected operating parameters for the same maneuver performed at a 10,100 training gross weight utilizing the suppressed 30-second OEI operating limits described hereinabove. The high degree of realism of the OEI flight procedures training maneuver, even though the OEI flight procedures training maneuver was conducted at a training gross weight that was 1,600 pounds less than the allowable gross weight and a suppressed 30-second OEI operating limit that was 200 SHP less than the actual 30-second OEI power ratings, is evinced by identical helicopter dynamic response and trim performance, as evidenced by rotor droop ($N_R$), pitch attitude, take off distance, and climb rate. The high degree of realism is further evidenced by the biased N1 and Q status indications so that it appears to the pilot that the dual-engine power required to hover corresponds to a much more heavily loaded condition, and that the single operative engine (simulated) is operating at the actual 30-second OEI N1 limit of 104.6% and Q limit of 135% after the simulated engine failure.

A variety of modifications and variations of the present invention are possible in light of the above teachings. It is therefore to be understood that, within the scope of the appended claims, the present invention may be practiced otherwise than as specifically described herein.

What is claimed is:

1. A system for conducting one engine inoperative flight procedures training in a dual-engine helicopter, comprising:
   a powerplant system for generating the power required for normal dual-engine and OEI flight operations of the dual-engine helicopter;
   a collective control system operative to provide control inputs to said powerplant system to control the normal dual-engine and OEI flight operations of the dual-engine helicopter;
   said powerplant system including
      left and right engines, each of said engines having design power ratings established therefore to limit the power output of said powerplant system during normal dual-engine flight operations and having 30-second, two-minute, and maximum continuous OEI power ratings established therefore to limit the power output of the single operative engine during OEI flight operations,
      a plurality of sensors associated with each of said engines for monitoring operating parameters thereof and generating sensor signals representative of said operating parameters of each of said engines,
      a cockpit instrument display system that includes parametric indicators for said operating parameters of each of said engines that are operative in response to said sensor signals to display indications representative of said operating parameters,
      a fuel subsystem fluidically interconnected to each of said engines and operative to provide fuel thereto,
      a DECU electrically interconnected to each said fuel subsystem and operative to regulate fuel flow therefrom to said powerplant system for regulating the power output of said powerplant system to control dual-engine and OEI flight operations of the dual-engine helicopter, said DECU being operative to automatically set said 30-second OEI power rating in response to an OEI condition to limit the power output of the single operative engine of said powerplant system during OEI flight operations, and being further operative in response to first and second activation signals to set said 2-minute and maximum continuous OEI power ratings as applicable to control the OEI flight operations of the dual-engine helicopter by limiting the power output of the single operative engine of said powerplant system to said 2-minute and maximum continuous OEI power ratings as applicable during the OEI flight operations, and
      said collective control system having integrated in combination therewith an OEI select switch that is operative to select said 2-minute and maximum continuous OEI power ratings as appropriate during OEI flight operations and that is operative, in response to selection of said 2-minute OEI power rating or said maximum continuous OEI power rating to generate said first and second activation signals to cause operation of said DECUs;
   a multi-function OEI training switch that is operative to initiate OEI flight procedures training by selecting one of said engines as the single operative engine for OEI flight procedures training and generating a control signal corresponding thereto; and
   a training function module that is
      operative to establish suppressed 30-second, 2-minute, and maximum continuous OEI operating ratings for selected engine operating parameters to limit the actual power provided by said powerplant system during OEI flight procedures training,
      operative to generate biasing factors to control the operation of said parametric indicators for the selected engine operating parameters during OEI flight procedures training,
      automatically operative in response to said control signal from said multi-function OEI training switch to set said suppressed 30-second OEI operating limits wherein the power output of the single operative engine is limited to said suppressed 30-second OEI operating limits during OEI flight procedures training,
      automatically operative in response to said control signal from said multi-function OEI training switch to set said biasing factors associated with said suppressed 30-second OEI operating limits wherein said parametric indicators for said selected engine operating parameters provide display indications indicative of said 30-second OEI power ratings,
      operative in response to said first activation signal generated by said OEI select switch to set said suppressed 2-minute OEI operating limits wherein the power output of the single operative engine is limited to said suppressed 2-minute OEI operating limits during OEI flight procedures training,
      operative in response to said first activation signal generated by said OEI select switch to set said biasing factors associated with said suppressed 2-minute OEI operating limits wherein said parametric indicators for said selected engine operating parameters provide display indications indicative of said 2-minute OEI power ratings,
      operative in response to said second activation signal generated by said OEI select switch to set said suppressed maximum continous OEI operating limits wherein the power output of the single operative engine is limited to said suppressed maximum continuous OEI operating limits during OEI flight procedures training, and
      operative in response to said second activation signal generated by said OEI select switch to set said biasing factors associated with said suppressed maximum continuous OEI operating limits wherein said parametric indicators for said selected engine operating parameters provide display indications indicative of said maximum continuous OEI power ratings.

2. A method for conducting one engine inoperative flight procedures training in a dual-engine helicopter, comprising the steps of:

providing a system for conducting OEI flight procedures training in a dual-engine helicopter;

determining a training gross weight for OEI flight procedures training;

establishing suppressed 30-second, 2-minute, and maximum continuous OEI operating limits for selected engine operating parameters to limit actual power provided by the helicopter powerplant system during OEI flight procedures training;

generating biasing factors to control the operation of parametric indicators of a cockpit instrument display system for the selected engine operating parameters during OEI flight procedures training;

operating a multi-function OEI training switch to initiate OEI flight procedures training by selecting one engine of powerplant system as the single operative engine for OEI flight procedures training;

automatically setting the suppressed 30-second OEI operating limits in response to initiation of the OEI flight procedures training wherein the power output of the single operative engine is limited to said suppressed 30-second OEI operating limits during OEI flight procedures training;

automatically setting the biasing factors associated with the suppressed 30-second OEI operating limits in response to initiation of the OEI flight procedures training wherein said parametric indicators for the selected engine operating parameters provide display indications indicative of actual 30-second OEI power ratings;

utilizing the system to fly the dual-engine helicopter in accordance with an OEI flight envelope during OEI flight procedures training;

manipulating an OEI select switch, as appropriate, to generate first and second activation signals controlling selection of the suppressed 2-minute and maximum continuous OEI operating limits, respectively, while flying the dual-engine helicopter in accordance with the OEI flight envelope;

setting, in response to said first activation signal, suppressed 2-minute OEI operating limits wherein the power output of the single operative engine is limited to said suppressed 2-minute OEI operating limits during OEI flight procedures training;

setting, in response to said first activation signal, biasing factors associated with the suppressed 2-minute OEI operating limits in response wherein said parametric indicators for the selected engine operating parameters provide display indications indicative of actual 2-minute OEI power ratings;

setting, in response to said second activation signal, the suppressed maximum continuous OEI operating limits wherein the power output of the single operative engine is limited to said suppressed maximum continuous OEI operating limits during OEI flight procedures training; and setting, in response to said second activation signal, said biasing factors associated with the suppressed maximum continuous OEI operating limits wherein said parametric indicators for the selected engine operating parameters provide display indications indicative of actual maximum continuous OEI power ratings.

* * * * *